(12) United States Patent
Zhang et al.

(10) Patent No.: US 10,739,226 B2
(45) Date of Patent: Aug. 11, 2020

(54) GAS LEAK POSITION ESTIMATION DEVICE, GAS LEAK POSITION ESTIMATION METHOD AND GAS LEAK POSITION ESTIMATION PROGRAM

(71) Applicant: KONICA MINOLTA, INC., Chiyoda-ku (JP)

(72) Inventors: Xiaochen Zhang, Suita (JP); Motohiro Asano, Osaka (JP); Toshitsugu Yamamoto, Takatsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 60 days.

(21) Appl. No.: 16/080,388

(22) PCT Filed: Feb. 28, 2017

(86) PCT No.: PCT/JP2017/007951
§ 371 (c)(1),
(2) Date: Aug. 28, 2018

(87) PCT Pub. No.: WO2017/150565
PCT Pub. Date: Sep. 8, 2017

(65) Prior Publication Data
US 2019/0078966 A1    Mar. 14, 2019

(30) Foreign Application Priority Data
Mar. 3, 2016    (JP) .................. 2016-041171

(51) Int. Cl.
*G01M 3/04* (2006.01)
*G01M 3/38* (2006.01)
(Continued)

(52) U.S. Cl.
CPC .............. *G01M 3/38* (2013.01); *G01M 3/002* (2013.01); *G01N 21/3504* (2013.01);
(Continued)

(58) Field of Classification Search
CPC ............................... H04N 13/239; H04N 5/33
See application file for complete search history.

(56) References Cited

U.S. PATENT DOCUMENTS

2005/0049804 A1 *   3/2005   Ardo ................... G01N 21/3518
                                                          702/51
2006/0203248 A1 *   9/2006   Reichardt ............... G01M 3/20
                                                          356/437
(Continued)

FOREIGN PATENT DOCUMENTS

EP          1512955         3/2005
JP          52-15385        2/1977
(Continued)

OTHER PUBLICATIONS

Written Opinion issued in corresponding PCT application PCT/JP2017/007951.
(Continued)

*Primary Examiner* — Cindy Trandai
(74) *Attorney, Agent, or Firm* — Cozen O'Connor

(57) ABSTRACT

This gas leak position estimation device is provided with a specifying unit and a first determination unit. The specifying unit specifies a gas region image indicating a region in which the gas hangs in an image obtained by photographing a monitoring region. The first determination unit determines a pixel indicating a gas leak estimated position estimated to be a position at which the gas is leaking out from a plurality of pixels constituting an outline of the gas region image.

18 Claims, 16 Drawing Sheets

(51) Int. Cl.
  *G01M 3/00* (2006.01)
  *G06T 7/174* (2017.01)
  *G06T 7/136* (2017.01)
  *G06T 7/00* (2017.01)
  *G06T 7/12* (2017.01)
  *G01N 21/3504* (2014.01)
  *G01N 25/72* (2006.01)
  *G01N 21/17* (2006.01)

(52) U.S. Cl.
  CPC .............. *G06T 7/0004* (2013.01); *G06T 7/12* (2017.01); *G06T 7/136* (2017.01); *G06T 7/174* (2017.01); *G01N 25/72* (2013.01); *G01N 2021/1795* (2013.01); *G06T 2207/10048* (2013.01); *G06T 2207/20221* (2013.01)

(56) References Cited

U.S. PATENT DOCUMENTS

| | | | |
|---|---|---|---|
| 2006/0220888 A1 | 10/2006 | Germouni et al. | |
| 2011/0018996 A1* | 1/2011 | Mian ................. | G08B 13/1672 348/143 |
| 2012/0314080 A1* | 12/2012 | Lee ................. | G08B 21/14 348/159 |
| 2014/0008526 A1* | 1/2014 | Zeng ................. | H04N 5/33 250/252.1 |
| 2014/0319714 A1* | 10/2014 | Shinozuka ............ | B01D 39/20 264/36.18 |
| 2016/0238451 A1* | 8/2016 | Zeng ................. | G06T 7/11 |
| 2016/0320296 A1* | 11/2016 | Asano ................. | G01J 5/0014 |
| 2017/0089800 A1* | 3/2017 | Huseynov ............ | G01S 5/20 |
| 2017/0211927 A1* | 7/2017 | Bridges ............... | H04N 5/2251 |
| 2017/0363541 A1* | 12/2017 | Sandsten ............ | G01N 21/3504 |
| 2018/0172544 A1* | 6/2018 | MacMullin ............ | G01F 1/00 |
| 2018/0259418 A1* | 9/2018 | Dudek ................. | G01M 17/007 |
| 2018/0266944 A1* | 9/2018 | Waxman ............ | G01J 5/0014 |
| 2018/0321141 A1* | 11/2018 | Tsuchiya ............ | G01M 3/38 |

FOREIGN PATENT DOCUMENTS

| | | |
|---|---|---|
| JP | 63-246638 | 10/1988 |
| JP | 8-122197 | 5/1996 |
| JP | 2000-310577 | 11/2000 |
| JP | 2012-058093 | 3/2012 |
| JP | 2013-190229 | 9/2013 |
| JP | 2014-55898 | 3/2014 |

OTHER PUBLICATIONS

International Search Report dated Mar. 23, 2017 issued in corresponding PCT application PCT/JP2017/007951.
Search Report dated Jan. 28, 2019 issued in European Patent Application No. 17760029.3.

\* cited by examiner

GAS LEAK POSITION ESTIMATION DEVICE, GAS LEAK POSITION ESTIMATION METHOD AND GAS LEAK POSITION ESTIMATION PROGRAM

RELATED APPLICATIONS

This is a U.S. National Phase Application under 35 USC 371 of International Application PCT/JP2017/007951 filed on Feb. 28, 2017.

This application claims the priority of Japanese application no. 2016-041171 filed Mar. 3, 2016, the entire content of which is hereby incorporated by reference.

TECHNICAL FIELD

The present invention relates to a technique of remotely sensing a leakage gas from a monitoring target.

BACKGROUND ART

At occurrence of a gas leak, a slight temperature change takes place at a location where the leakage gas hangs. Remote gas sensing using an infrared camera is known as a technique for sensing gas using this principle.

As gas sensing using infrared images, for example, Patent Literature 1 discloses a gas leak detection apparatus including: an infrared camera for photographing an inspection target region; and an image processing unit for processing an infrared image photographed by an infrared camera, in which the image processing unit includes a fluctuation extraction unit for extracting dynamic fluctuation due to a gas leak from a plurality of infrared images aligned in time series.

When a gas leak is sensed in a plant or the like, an engineer needs to visit a gas leak position and repair the gas leak. In gas sensing using an infrared image, an image including a gas region image illustrating a region in which the leakage gas hangs is displayed on a display unit. The engineer searches for a gas leak position using the gas region image as a clue. Since the gas region image is a surface and the gas leak position is a point, specifying the gas leak position from the gas region image is not easy and takes time. Particularly in a case where the area of the gas region image is wide, it is difficult to specify the gas leak position from the gas region image. This increases a demand for a technique capable of estimating the gas leak position from the gas region image.

CITATION LIST

Patent Literature

Patent Literature 1: JP 2012-58093 A

SUMMARY OF INVENTION

An object of the present invention is to provide a gas leak position estimation device, a gas leak position estimation method and a gas leak position estimation program capable of estimating a gas leak position on the basis of a gas region image.

A gas leak position estimation device according to a first aspect of the present invention for achieving the above object includes a specifying unit and a first determination unit. The specifying unit specifies a gas region image indicating a region in which the gas hangs in an image obtained by photographing a monitoring region. The first determination unit determines a pixel indicating a gas leak estimated position estimated to be a position at which the gas is leaking out from a plurality of pixels constituting an outline of the gas region image.

The above and other objects, features and advantages of the present invention will become apparent from the following detailed description and the accompanying drawings.

DESCRIPTION OF EMBODIMENTS

Figure 1:
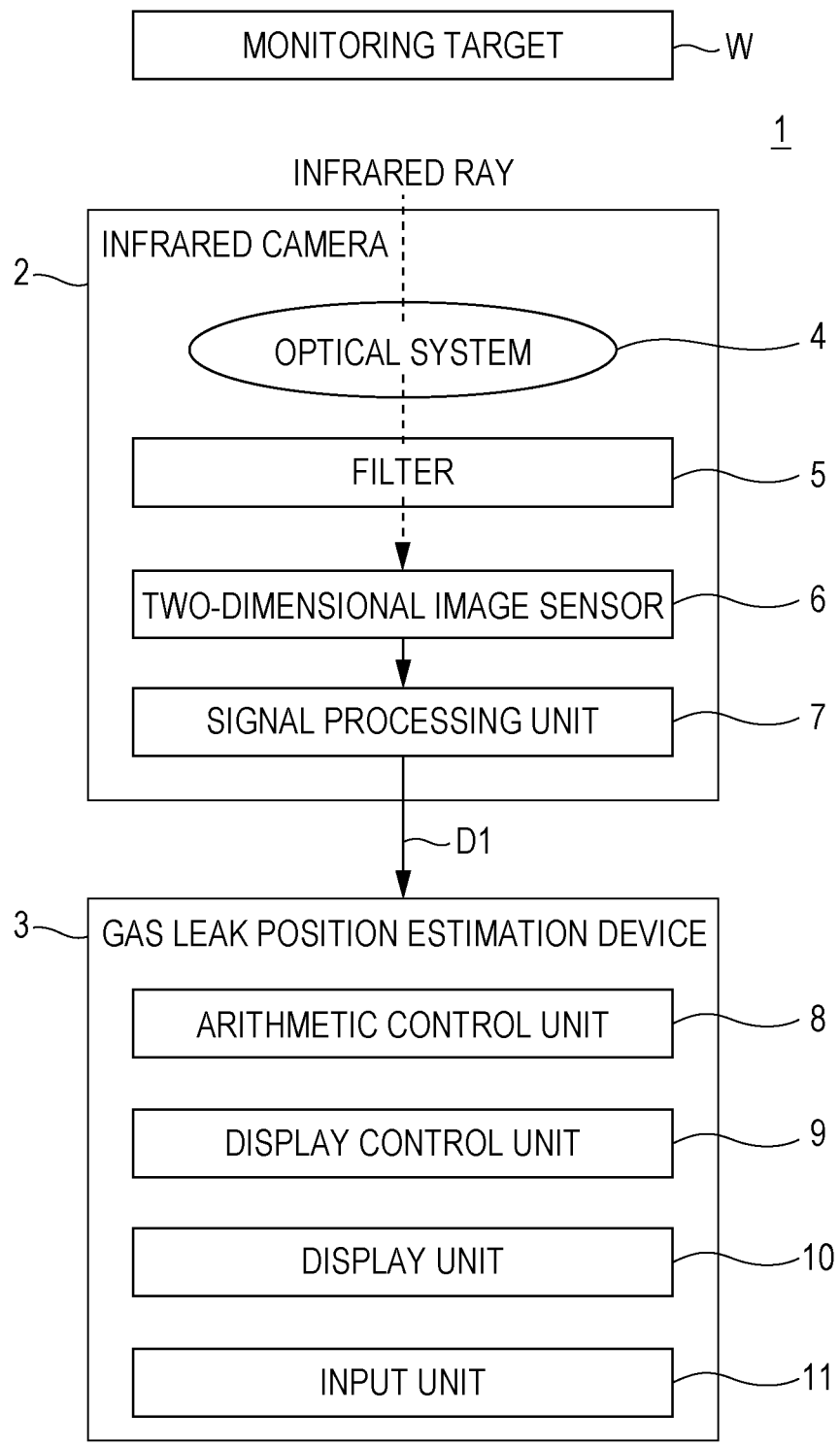
FIG. 1 is a block diagram of a gas leak position estimation system to which a gas leak position estimation device according to the present embodiment is applied.

Hereinafter, an embodiment of the present invention will be described in detail on the basis of the drawings. In each of the drawings, configurations denoted by the same reference numerals indicate that they have the same configuration, and the description already given for the configuration is omitted.

FIG. 1 is a block diagram of a gas leak position estimation system 1 to which a gas leak position estimation device 3 according to the present embodiment is applied. The gas leak position estimation system 1 includes an infrared camera 2 and the gas leak position estimation device 3.

The infrared camera 2 photographs a moving image, that is, an infrared image of a monitoring target W of gas leak (for example, a position connecting gas transport pipes to each other) and its background so as to generate moving image data D1 indicating a moving image.

The moving image data D1 is an example of image data of an infrared image. The infrared image of the gas leak monitoring target W and its background may be captured by the infrared camera 2 at a plurality of times, not limited to the moving image. The monitoring target W for gas leak can also be referred to as a monitoring region for gas leak. Therefore, frames constituting the moving image and infrared images captured at the plurality of times can be referred to as images indicating the monitoring region. The infrared camera 2 includes an optical system 4, a filter 5, a two-dimensional image sensor 6, and a signal processing unit 7.

The optical system 4 forms an infrared image of a subject (monitoring target W and background) on the two-dimensional image sensor 6. The filter 5 is disposed between the optical system 4 and the two-dimensional image sensor 6, and transmits infrared light of a specific wavelength alone among the light transmitted through the optical system 4. Among the infrared wavelength bands, the wavelength band transmitted through the filter 5 depends on the type of gas to be sensed. For example, in the case of methane, the filter 5 that transmits a wavelength band of 3.2 μm to 3.4 μm is used. The two-dimensional image sensor 6 is, for example, a cooled indium antimony (InSb) image sensor, and receives infrared rays transmitted through the filter 5. The signal processing unit 7 converts an analog signal output from the two-dimensional image sensor 6 into a digital signal and performs known image processing on the signal. This digital signal becomes moving image data D1. The moving image data D1 generated by the infrared camera 2 is input to the gas leak position estimation device 3 via an interface circuit.

The gas leak position estimation device 3 is a personal computer, a smartphone, a tablet terminal, or the like, and includes an arithmetic control unit 8, a display control unit 9, a display unit 10, and an input unit 11 as functional blocks. The arithmetic control unit 8 and the display control unit 9 are implemented by a processor. More specifically, the gas leak position estimation device 3 includes a central processing unit (CPU) as a processor, a random access memory (RAM), a read only memory (ROM), and a hard disk drive (HDD). The arithmetic control unit 8 and the display control unit 9 are implemented by execution of programs stored in the ROM and the HDD by the processor using the RAM. The display unit 10 is implemented by various displays such as a liquid crystal display and an organic electroluminescence display. The input unit 11 is implemented by a keyboard, a touch panel, or the like.

The arithmetic control unit 8 performs various types of arithmetic operation and controls related to the operation of the gas leak position estimation device 3. The arithmetic operation includes image processing for obtaining a gas leak estimated position and image processing for sensing a gas leak, which is a premise of this processing.

The display control unit 9 controls to display a predetermined image on the display unit 10. The predetermined image is, for example, a moving image indicated by the moving image data D1 or an infrared image of the monitoring target W (in other words, the monitoring region) in which the gas leak estimated position is indicated.

Various inputs necessary for the operation of the gas leak position estimation device 3 are performed to the input unit 11.

Operation of the gas leak position estimation device 3 according to the present embodiment will be described. The operation of the gas leak position estimation device 3 includes processing of extracting a gas region image. The gas region image is an image that is included in an infrared image of the monitoring target W and indicates a region in which the leakage gas from the monitoring target W hangs. When the gas region image is successfully extracted, the arithmetic control unit 8 determines that gas leak has occurred.

Examples of image processing for extracting a gas region image include a temperature threshold method and a moving object detection method. The temperature threshold method can be applied when the temperature of the leaking gas is higher or lower than the ambient temperature of the location of the monitoring target W. The temperature threshold method performs predetermined calculation using a temperature indicated by a pixel value of a pixel and the ambient temperature, and determines whether a gas exists at a position corresponding to the pixel. In the temperature threshold method, determination is made for all the pixels constituting a frame (infrared image), and a group of pixels corresponding to positions where gas is present is defined as a gas region image.

The moving object detection method detects an image indicating a moving object region included in a frame and defines this image as a gas region image. That is, the moving object detection method determines a pixel having a difference in pixel value between pixels located at a same position in a frame of interest and a reference frame being larger than a predetermined threshold as a pixel constituting an image indicating a moving object region. A group of these pixels (that is, an image illustrating a moving object region) is a gas region image. The reference frame is a frame immediately before the frame of interest, a frame a predetermined number before the frame of interest, and an infrared image of a monitoring target W in a state where no gas leak occurs photographed in the past.

Figure 2:
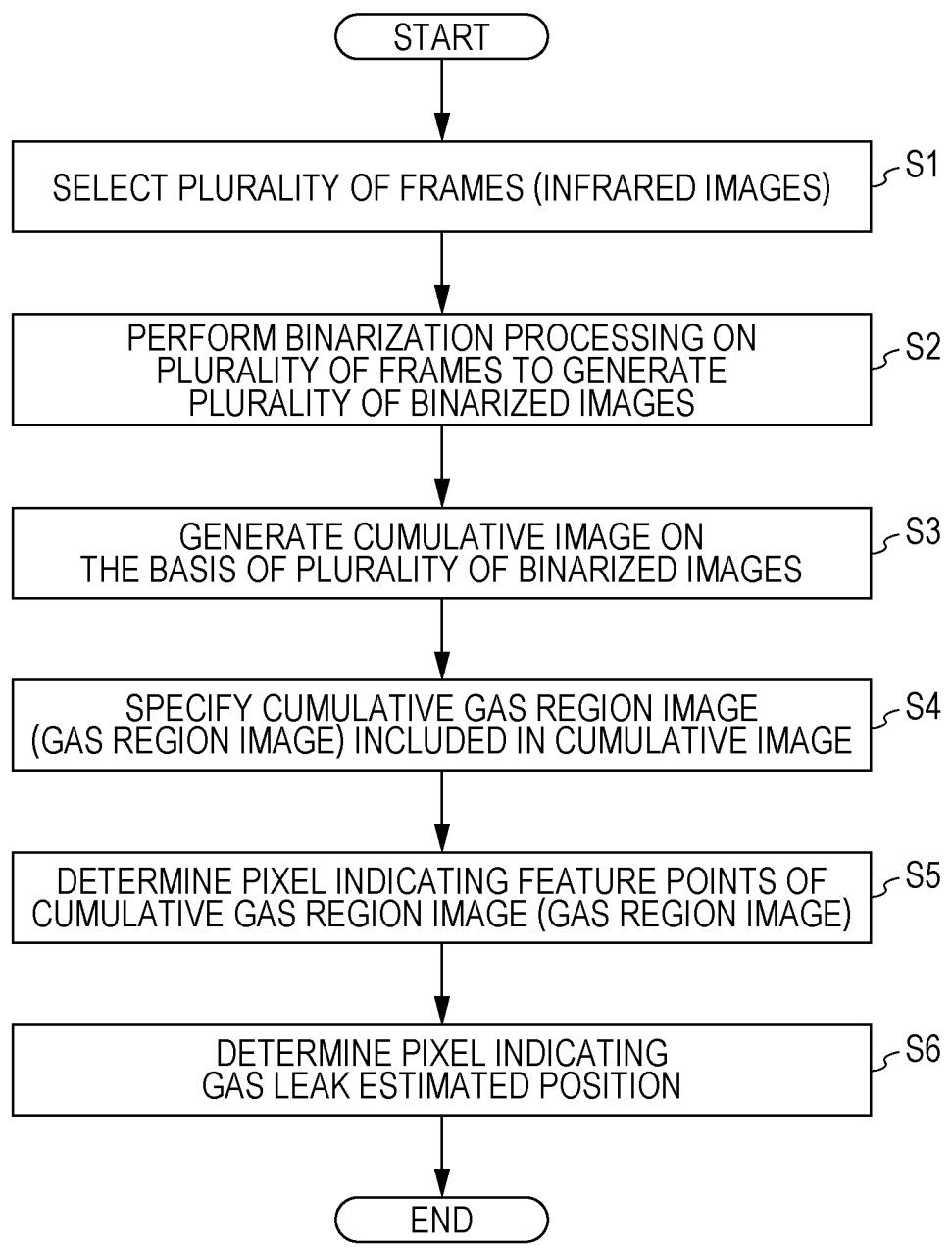
FIG. 2 is a flowchart illustrating operation of a program performed by a processor of the gas leak position estimation device according to the present embodiment.

FIG. 2 is a flowchart illustrating operation of a program performed by the processor of the gas leak position estimation device 3. Referring to 1 and 2, when an operator operates the input unit 11 to input a command to start gas sensing, the gas leak position estimation device 3 receives a moving image data D1 transmitted from the infrared camera 2. The arithmetic control unit 8 selects the moving image data D1 as a plurality of consecutive frames (step S1). In the following description, 300 frames are taken as an example.

Figure 3:
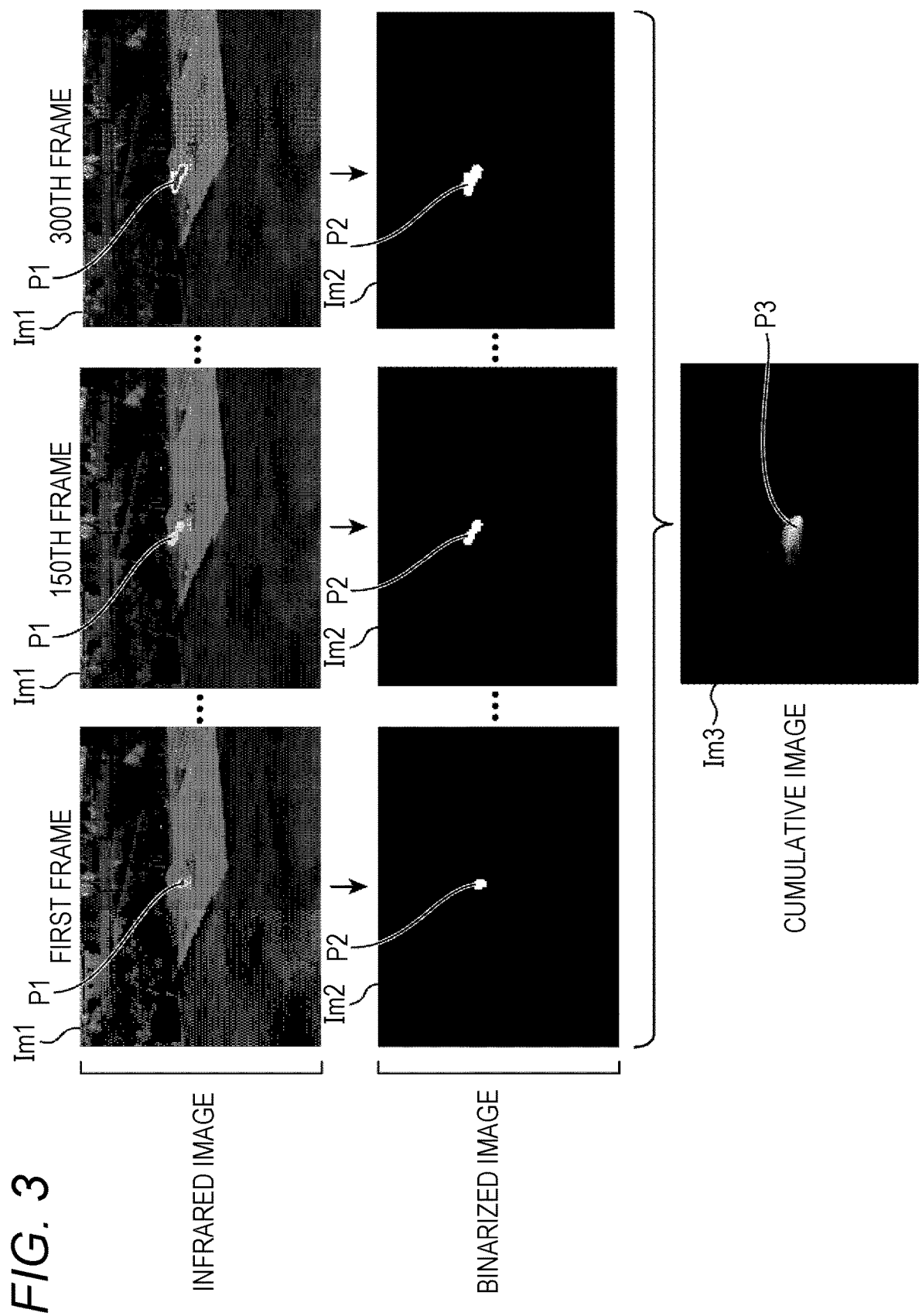
FIG. 3 is an image diagram generated by image processing performed until generation of a cumulative image on the basis of moving image data indicating a moving image photographed by an infrared camera.

FIG. 3 is an image diagram generated by image processing performed until generation of a cumulative image Im3 on the basis of moving image data D1 indicating a moving image photographed by the infrared camera 2. The infrared image Im1 of 300 images (first to 300th frames) is the 300 frames selected in step S1. The 300 frames are moving images of 10 seconds when the frame rate of the moving image indicated by the moving image data D1 is 30 fps, for example.

Each of the 300 infrared images Im1 includes an instantaneous gas region image P1. The instantaneous gas region image P1 is a gas region image indicating a region in which the leakage gas from the monitoring target W appearing in the frame hangs at the time of photographing the frame. For example, the instantaneous gas region image P1 of the first frame is a gas region image indicating a region in which gas leaking from the monitoring target W hangs at the time of photographing the first frame, the instantaneous gas region image P1 of the 150th frame is a gas region image indicating a region in which gas leaking from the monitoring target W hangs at the time of photographing the 150th frame, and the instantaneous gas region image P1 of the 300th frame is a gas region image indicating a region in which gas leaking from the monitoring target W hangs at the time of photographing the 300th frame.

The instantaneous gas region image P1 is extracted by the arithmetic control unit 8. That is, the arithmetic control unit 8 functions as a first extraction unit, and performs processing of extracting the instantaneous gas region image P1 indicating the region in which the gas hangs at a point of photographing each of the frames from each of the frames constituting the moving image data D1 (plurality of images aligned in time series).

The arithmetic control unit 8 performs binarization processing of defining pixels constituting the instantaneous gas region image P1 as "1" and defining the other pixels as "0" onto each of the 300 infrared images Im1 including the instantaneous gas region image P1, so as to generate 300 binarized images Im2 (step S2). A group of pixels indicated by "1" corresponds to an instantaneous gas region image P2 after binarization processing.

The arithmetic control unit 8 performs processing of accumulating 300 binarized images Im2, and generates a cumulative image Im3 (step S3). Specifically, in the binarized image Im2 of 300 sheets, pixel values of pixels at a same position are added. Since the pixel value of the pixel constituting the binarized image Im2 is binary, that is, 1 or 0, the maximum value that can be the pixel value of the pixel constituting the cumulative image Im3 is 300.

The cumulative image Im3 includes a cumulative gas region image P3. The cumulative gas region image P3 is a gas region image generated by the generation of the cumulative image Im3, and a cumulative image of 300 instantaneous gas region images P2 by processing of adding pixel values of pixels at a same position on the 300 instantaneous gas region images P2. In this manner, the arithmetic control unit 8 functions as a generation unit that generates the cumulative gas region image P3. That is, in a plurality of instantaneous gas region images P2 extracted from each of a plurality of images (300 frames), the generation unit performs processing of adding pixel values of pixels at a same position and generates the cumulative gas region image P3 as an image accumulating a plurality of instantaneous gas region images P2.

The arithmetic control unit 8 may accumulate 300 infrared images Im1 to generate a cumulative image (not illustrated) without generating 300 binarized images Im2 Since the pixel values of the pixels constituting the infrared image Im1 are not binary but multivalued, the maximum value which can be the pixel value of the pixels constituting this cumulative image is larger than 300.

Figure 4:
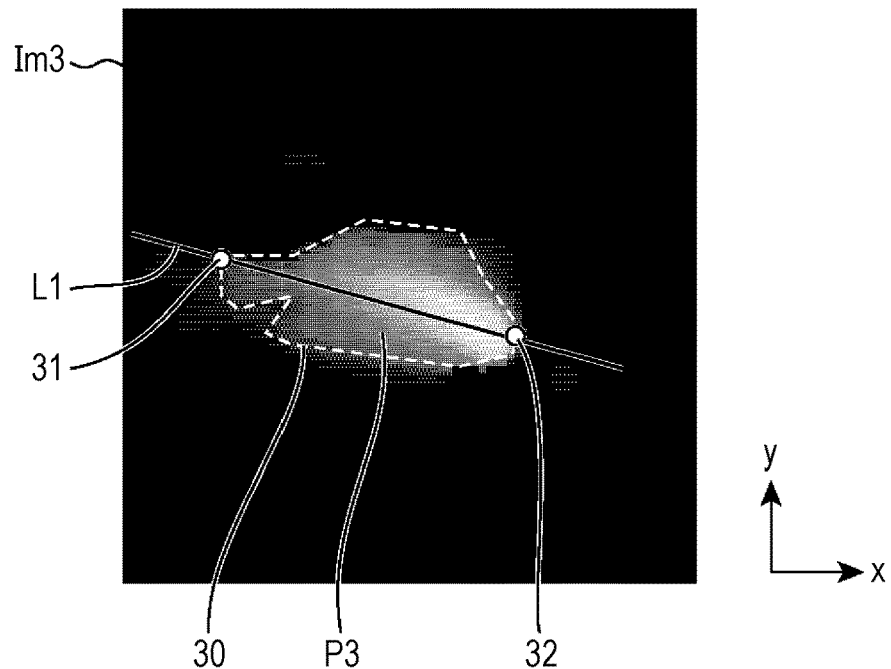
FIG. 4 is an image diagram illustrating a relationship between cumulative gas region images and pixels indicating feature points.
Figure 6:
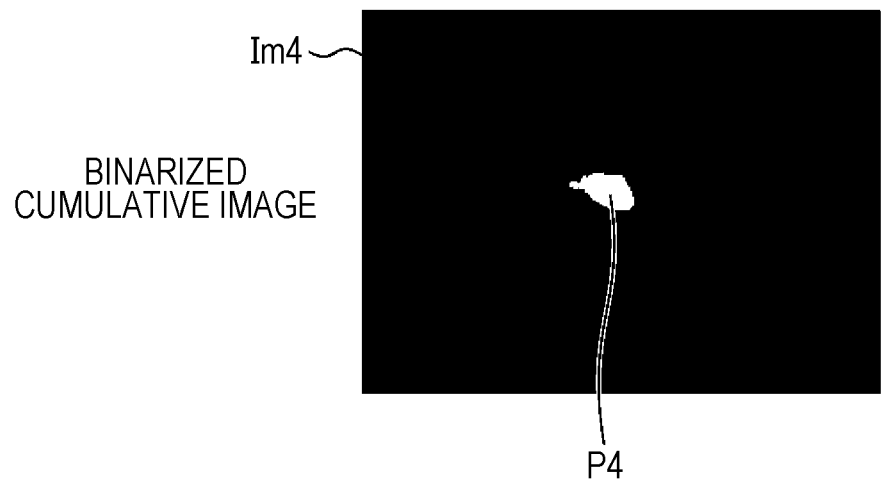
FIG. 6 is an image diagram illustrating a binarized cumulative image.

FIG. 4 is an image diagram illustrating a relationship between the cumulative gas region images P3 and pixels indicating feature points. The cumulative image Im3 illustrated in FIG. 4 is an enlarged image of the cumulative gas region image P3 of the cumulative image Im3 illustrated in FIG. 3 and the periphery thereof. The arithmetic control unit 8 functions as a specifying unit. Referring to FIG. 4, the arithmetic control unit 8 binarizes the cumulative image Im3 to generate a binarized cumulative image Im4 illustrated in FIG. 6, and specifies a cumulative gas region image P4 after binarization processing included in the binarized cumulative image Im4 (step S4). The threshold for binarization is, for example, 20% of the number of frames used for generating the cumulative image Im3. When the number of frames is 300, the threshold is 60. The arithmetic control unit 8 compares each of the pixel values of all pixels constituting the cumulative image Im3 with a threshold, and defines the pixel value larger than the threshold to "1", the pixel value of the threshold or less to "0". This operation generates the binarized cumulative image Im4. The group of pixels indicating "1" forms the cumulative gas region image P4 after binarization processing. In this manner, the arithmetic control unit 8 (specifying unit) specifies the cumulative gas region image P4 (gas region image) after the binarization processing in the frame (image obtained by photographing the monitoring region).

Hereinafter, as described with reference to FIG. 4, the cumulative image Im3 signifies the binarized cumulative image Im4, and the cumulative gas region image P3 signifies the cumulative gas region image P4 after binarization processing. Also in the description using FIG. 5, FIGS. 7 to 16, FIG. 18, FIG. 19, and FIG. 22, the cumulative image Im3 signifies the binarized cumulative image Im4, the cumulative gas region image P3 signifies the cumulative gas region image P4 after binarization processing.

The arithmetic control unit 8 specifies the cumulative gas region image P3 included in the cumulative image Im3 as the gas region image. Alternatively, however, it is allowable to use a mode in which the arithmetic control unit 8 selects one infrared image Im1 from which the instantaneous gas region image P1 has been extracted and an image in which the instantaneous gas region image P1 has been binarized, generated by binarization processing of the infrared image Im1, is specified as a gas region image, without generating the cumulative image Im3.

The arithmetic control unit 8 determines a pixel indicating the feature point of the cumulative gas region image P3 (step B5). This will be described in detail with reference to FIG. 4. The cumulative gas region image P3 is constituted with a plurality of pixels. The arithmetic control unit 8 functions as a first calculation unit and calculates a regression line L1 indicating a relationship between the positions of a plurality of pixels (all pixels) constituting the cumulative gas region image P3. The regression line L1 is calculated using the least squares method. That is, the number of pixels constituting the cumulative gas region image P3 is defined as N, leading to coordinate values $(x_i, y_i)$ of the individual positions of the N pixels (i=1, ..., N). The arithmetic control unit 8 assigns the coordinate value (xi, yi) into a linear function y=ax+b to calculate a gradient a and an intercept b. A linear function having the calculated gradient a and intercept b corresponds to the regression line L1 (an example of a regression line). A higher order, specifically, a second or higher order regression curve (another example of the regression line) may be used instead of the regression line L1.

The arithmetic control unit 8 performs processing of superimposing the regression line L1 on the cumulative gas region image P3 and obtains a pixel at which switching is performed from the pixel constituting the cumulative gas region image P3 to the pixels not constituting the cumulative gas region image P3 (that is, two points at which an outline 30 of the cumulative gas region image P3 intersects the regression line L1) among the pixels constituting the regression line L1. The pixel indicating one of the two points is defined as a first pixel 31 and the pixel indicating the other of the two points is defined as a second pixel 32. Each of the first pixel 31 and the second pixel 32 is a pixel indicating a feature point. Note that one of the first pixel 31 and the second pixel 32 may be used as a feature point.

As described above, the arithmetic control unit 8 functions as the first determination unit. That is, the arithmetic control unit 8 (first determination unit) determines the pixel indicating the feature point of the cumulative gas region image P3 (gas region image) from among a plurality of pixels constituting the outline 30 of the cumulative gas region image P3 and determines the pixel indicating the gas leak estimated position from among the feature points. While the embodiment determines the pixel indicating the gas leak estimated position from among the pixels indicating the feature points, the pixel is not limited to the pixel indicating the feature point. That is, the arithmetic control unit 8 (first determination unit) may determine the pixel indicating the gas leak estimated position from among a plurality of pixels constituting the outline 30 of the cumulative gas region image P3 (gas region image).

The arithmetic control unit 8 determines a pixel indicating a gas leak estimated position (step S6). Specifically, the arithmetic control unit 8 obtains a pixel-of-interest 33. A leakage gas hangs in a region corresponding to the cumulative gas region image P3 (gas region image). This region includes a portion where the gas concentration is high, and the pixel corresponding to this portion is the pixel-of-interest 33. The pixel-of-interest 33 is, for example, a pixel having a largest pixel value among a plurality of pixels (all pixels) constituting the cumulative gas region image P3, or a pixel indicating a centroid of the cumulative gas region image P3. Gas concentration thickness product is a value obtained by integrating the gas concentration along a depth direction of a space in which the gas hangs. The highest pixel value signifies the highest frequency of occurrence of gas. The centroid can be obtained by a known method.

Figure 5:
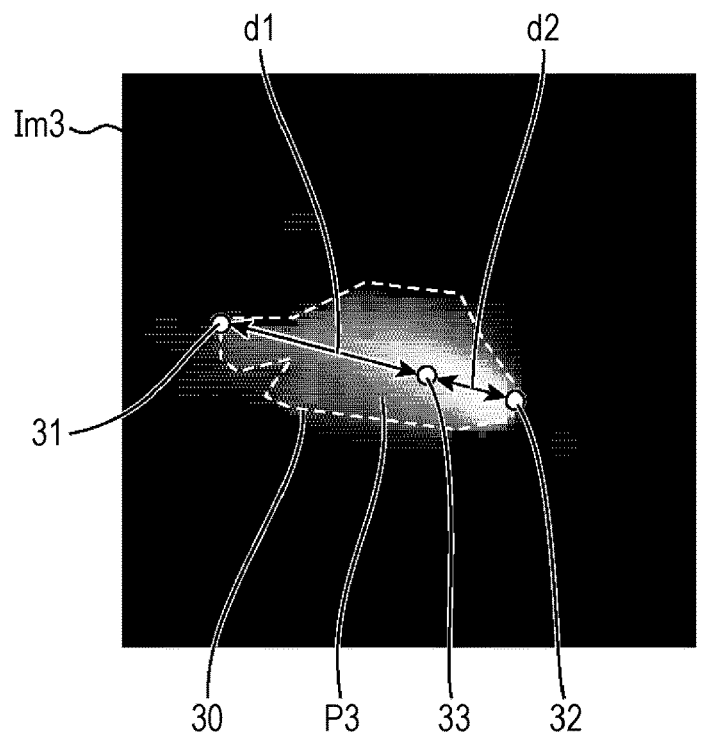
FIG. 5 is an image diagram illustrating a relationship between cumulative gas region images, pixels indicating feature points, and pixel-of-interests.

The arithmetic control unit 8 functions as a second determination unit and determines one of the first pixel 31 and the second pixel 32 as the pixel indicating the gas leak estimated position. FIG. 5 is an image diagram illustrating a relationship between the cumulative gas region image P3, pixels indicating feature points (first pixels 31 and second pixels 32), and the pixel-of-interest 33. When a distance d1 between the first pixel 31 and the pixel-of-interest 33 is shorter than a distance d2 between the second pixel 32 and the pixel-of-interest 33, the arithmetic control unit 8 determines the first pixel 31 as the pixel indicating the gas leak estimated position. When the distance d2 between the second pixel 32 and the pixel-of-interest 33 is shorter than the distance d1 between the first pixel 31 and the pixel-of-interest 33, the arithmetic control unit 8 determines the second pixel 32 as the pixel indicating the gas leak estimated position.

A location corresponding to the pixel-of-interest 33 has high gas concentration level among the regions in which the leakage gas from the monitoring target W hangs. Accordingly, the arithmetic control unit 8 determines one of the first pixel 31 and the second pixel 32 closer to the pixel-of-interest 33 as the pixel indicating the gas leak estimated position. In FIG. 5, since the distance d2 is shorter than the distance d1, the second pixel 32 is determined as the gas leak estimated position.

The display control unit 9 visualizes the pixel indicating the gas leak estimated position determined in step S6 as the gas leak estimated position and controls to display the infrared image (not illustrated) of the monitoring target W indicating the gas leak estimated position on the display unit 10.

Main effects of the present embodiment will be described. Since the gas region image is an image indicating a region in which the leakage gas hangs from the monitoring target W (FIG. 1), the gas region image includes the gas leak position. The inventors of the present invention found that the gas leaking from the monitoring target W is fluctuated by wind or the like, and that the gas leak position is likely to be present in the outline of the gas region image or in the vicinity thereof. From this findings, the present inventors considered that it is appropriate to determine a certain position on the outline of the gas region image as the gas leak estimated position.

Therefore, referring to FIG. 5, the gas leak position estimation device 3 according to the present embodiment defines the cumulative gas region image P3 as a gas region image and determines the pixel indicating the feature point of the cumulative gas region image P3, which is used for determining the pixel indicating the gas leak estimated position (first pixel 31 and second pixel 32) from among the plurality of pixels constituting the outline 30 of the cumulative gas region image P3. Accordingly, with the gas leak position estimation device 3 according to the present embodiment, it is possible to estimate the gas leak position using the cumulative gas region image P3 (gas region image).

Moreover, referring to FIG. 4, the regression line L1 linearly approximates the position of each of the plurality of pixels constituting the cumulative gas region image P3 (gas region image). The gas leak position estimation device 3 according to the present embodiment defines pixels (the first pixel 31 and the second pixel 32) indicating two points at which the regression line L1 and the outline 30 of the cumulative gas region image P3 intersect with each other as pixels indicating the feature points of the cumulative gas region image P3 so as to narrow down the number of pixels serving as the feature points from among the plurality of pixels constituting the outline 30 of the cumulative gas region image P3.

A modification of the present embodiment will be described. In a first modification, the processing of step S5 illustrated in FIG. 2 is different from the present embodiment. While the present embodiment obtains the pixels indicating the feature points (the first pixel 31 and the second pixel 32) using the regression line L1 illustrated in FIG. 4, the first modification obtains the pixels indicating the feature points using a rectangle (circumscribed rectangle) circumscribing the cumulative gas region image P3.

Figure 7:
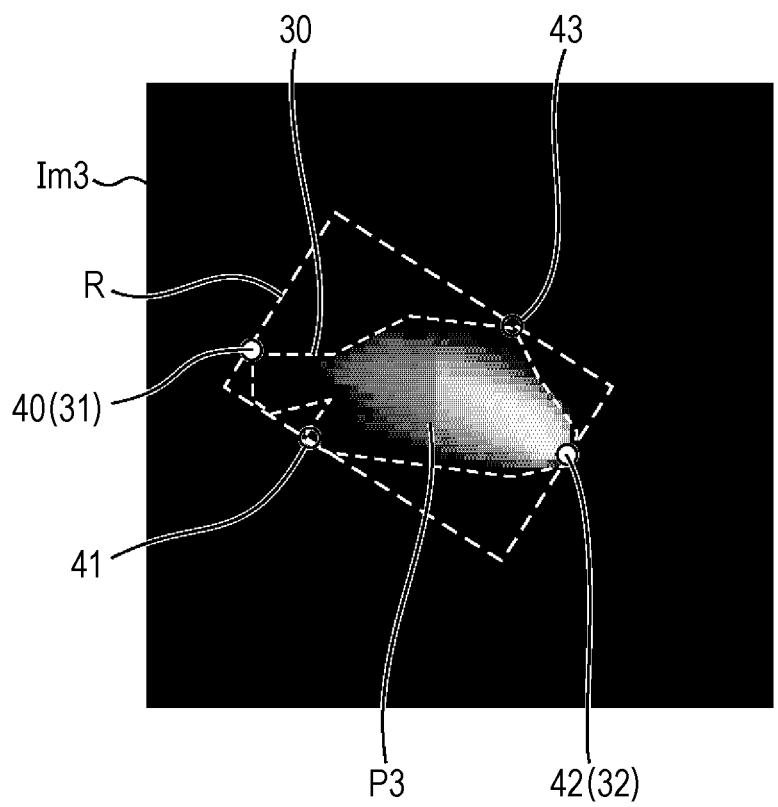
FIG. 7 is an image diagram illustrating a relationship between a cumulative gas region image and a circumscribed rectangle in a first modification.

FIG. 7 is an image diagram illustrating a relationship between the cumulative gas region image P3 and the circumscribed rectangle R in the first modification, and corresponds to FIG. 4. The circumscribed rectangle R is a rectangle having four sides being in contact with the cumulative gas region image P3 (gas region image) and surrounding the cumulative gas region image P3. In other words, the circumscribed rectangle R is a rectangle having four sides being in contact with the outline 30 of the cumulative gas region image P3 and surrounding the outline 30. The cumulative gas region image P3 and the four sides of the circumscribed rectangle R are in contact with each other at contacts 40, 41, 42, and 43.

The arithmetic control unit 8 functions as a setting unit and sets the circumscribed rectangle R. The arithmetic control unit 8 functions as the first determination unit. That is, the arithmetic control unit 8 (first determination unit) determines the first pixel 31 and the second pixel 32 respectively located at two points (contacts 40 and 42) where two short sides of the circumscribed rectangle R and the cumulative gas region image P3 come in contact with each other, as pixels indicating the feature points. Note that one of the first pixel 31 and the second pixel 32 may be used as a feature point.

The circumscribed rectangle R is a rectangle approximating the cumulative gas region image P3 (gas region image). The gas that leaked from the monitoring target W tends to spread in one direction, not uniformly spreading in all directions while the wind direction is constant. Therefore, there is a high possibility that the gas leak position exists on one short side of the two short sides of the circumscribed rectangle R. The first modification defines pixels indicating two points at which the two short sides of the circumscribed rectangle R and the cumulative gas region image P3 (the first pixel 31 and the second pixel 32) come in contact with each other as pixels indicating the feature points of the cumulative gas region image P3 so as to narrow down the number of pixels serving as the feature points of the cumulative gas region image P3 from among the plurality of pixels constituting the outline 30 of the cumulative gas region image P3.

There is a plurality of the circumscribed rectangles R. It is considered preferable that the circumscribed rectangle R most approximate to the cumulative gas region image P3 (gas region image) among the circumscribed rectangles R is set as the circumscribed rectangle R. The circumscribed rectangle R having a minimum area is the circumscribed rectangle most approximate to the cumulative gas region image P3 (gas region image). The arithmetic control unit 8 sets the circumscribed rectangle R having the minimum area as the circumscribed rectangle R.

Figure 8:
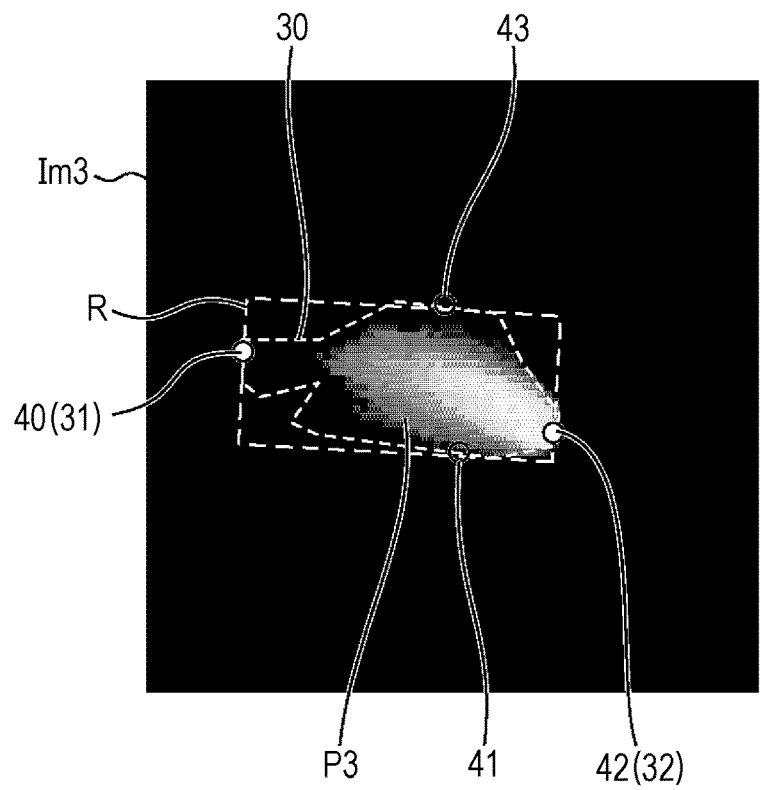
FIG. 8 is an image diagram illustrating a relationship between a cumulative gas region image and a circumscribed rectangle having a minimum area in the first modification.

FIG. 8 is an image diagram illustrating a relationship between the cumulative gas region image P3 and the circumscribed rectangle R having the minimum area in the first modification, and corresponds to FIG. 4. The arithmetic control unit 8 sets a reference rectangle (not illustrated) surrounding the cumulative gas region image P3. The arithmetic control unit 8 adjusts the lengths of the long side and the short side of the reference rectangle to obtain the circumscribed rectangle R and calculates the area thereof. The arithmetic control unit 8 rotates the reference rectangle little by little (for example, rotates by one degree) about its center point (not illustrated) and performs the same processing (acquisition of the circumscribed rectangle R and calculating the area thereof). The arithmetic control unit 8 repeats the processing until the reference rectangle is rotated by 180 degrees. The arithmetic control unit 8 sets the circumscribed rectangle R having the minimum area among the circumscribed rectangles R obtained as the circumscribed rectangle R.

A second modification will be described. In a second modification, the processing of step S5 illustrated in FIG. 2 is different from the present embodiment. As illustrated in FIG. 4, the present embodiment obtains the pixels indicating the feature points (the first pixel 31 and the second pixel 32) using the regression line L1 indicating a relationship between individual positions of the plurality of pixels constituting the cumulative gas region image P3. In contrast, the second modification obtains the pixels indicating the feature points (the first pixel 31 and the second pixel 32) using a regression line L2 (FIG. 12) indicating a relationship between individual positions of two or more centroids.

Figure 9:
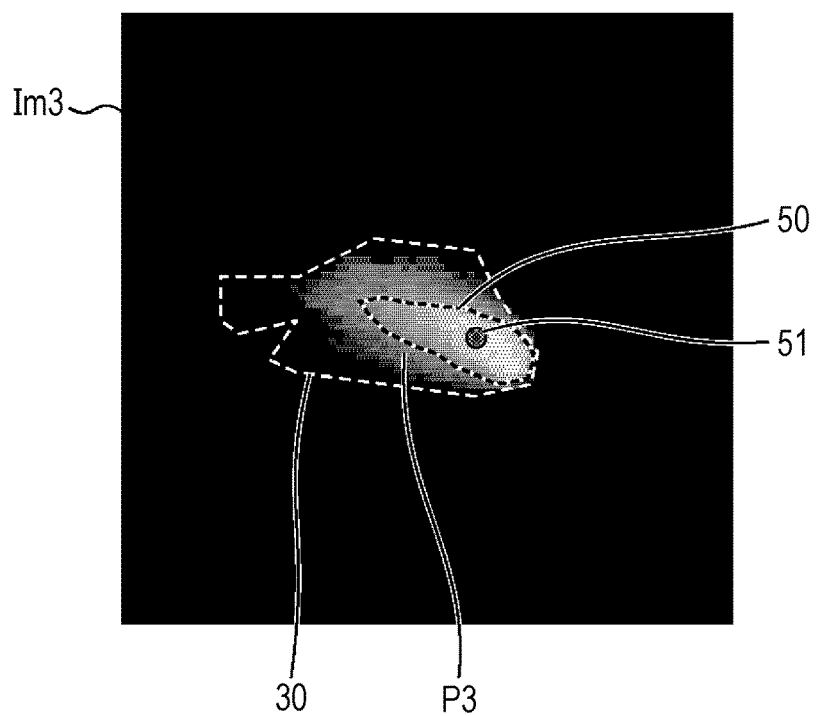
FIG. 9 is an image diagram of a cumulative image including an outline of an image constituted by pixels extracted at a threshold A.
Figure 10:
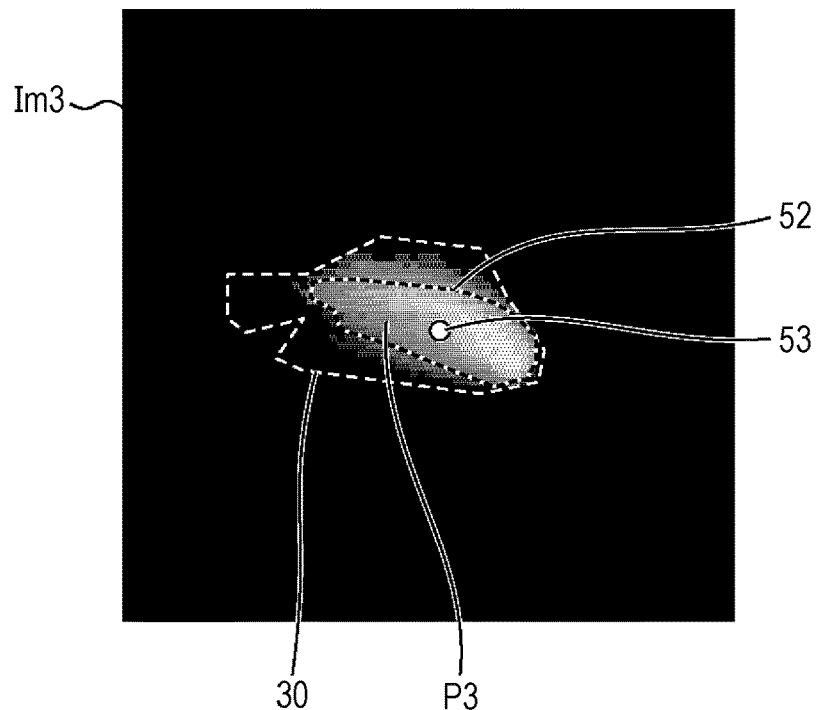
FIG. 10 is an image diagram of a cumulative image including an outline of an image constituted by pixels extracted at a threshold B.
Figure 11:
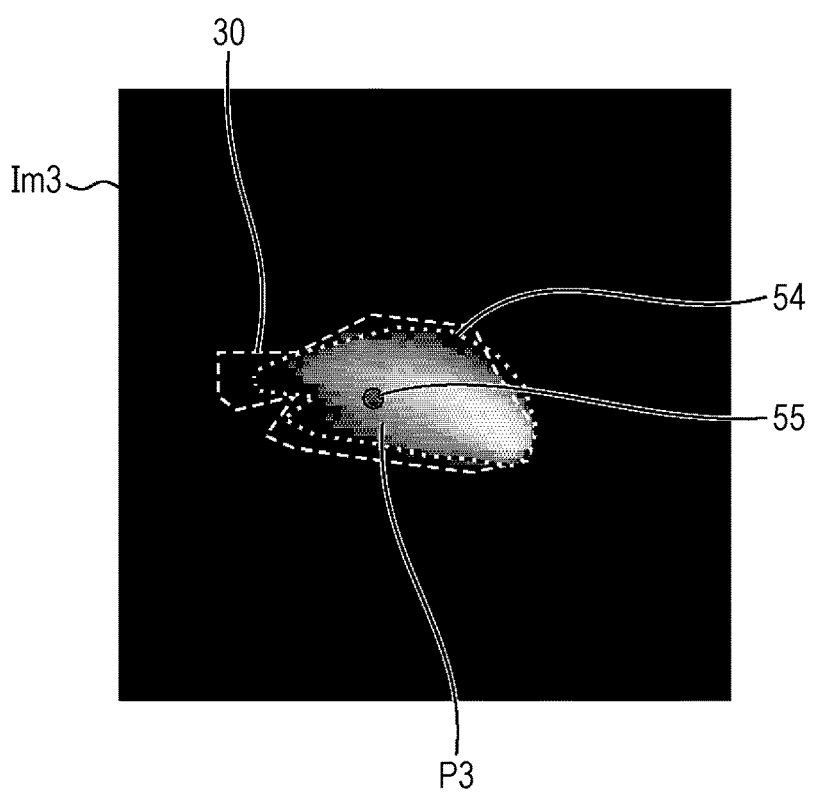
FIG. 11 is an image diagram of a cumulative image including an outline of an image constituted by pixels extracted at a threshold C.

The arithmetic control unit 8 functions as a second extraction unit. The arithmetic control unit 8 (second extraction unit) performs extraction processing of extracting pixels from among a plurality of pixels (all pixels) constituting the cumulative image Im3 illustrated in FIG. 3 on the basis of a predetermined threshold. The arithmetic control unit 8 performs extraction processing on the basis of each of two or more thresholds of different values. Here, there are three thresholds A, B, and C (threshold A>threshold B>threshold C). The threshold is, for example, 70%, 40%, and 10% of the number of frames used for generating the cumulative image Im3. When the number of frames is 300, the threshold A is 210, the threshold B is 120, and the threshold C is 30. FIG. 9 is an image diagram of the cumulative image Im3 including an outline 50 of the image constituted by the pixels extracted with the threshold A. FIG. 10 is an image diagram of the cumulative image Im3 including an outline 52 of the image constituted by the pixels extracted with the threshold B. FIG. 11 is an image diagram of the cumulative image Im3 including an outline 54 of the image constituted by the pixels extracted with the threshold C.

The arithmetic control unit 8 functions as the first calculation unit. The arithmetic control unit 8 (first calculation unit) performs calculation processing of calculating a centroid of an image constituted with the pixels extracted with the threshold. The arithmetic control unit 8 (first calculation unit) calculates two or more centroids by performing calculation processing on images corresponding to each of two or more thresholds of different values. More specifically, referring to FIG. 9, the arithmetic control unit 8 extracts pixels larger than the threshold A among the plurality of pixels (all pixels) constituting the cumulative image Im3. The arithmetic control unit 8 obtains a centroid 51 of the image constituted with the extracted pixels.

Referring to FIG. 10, arithmetic control unit 8 extracts pixels larger than threshold B among a plurality of pixels (all pixels) constituting the cumulative image Im3. The arithmetic control unit 8 obtains a centroid 53 of the image constituted with the extracted pixels.

Referring to FIG. 11, arithmetic control unit 8 extracts pixels larger than the threshold C among a plurality of pixels (all pixels) constituting the cumulative image Im3. The arithmetic control unit 8 obtains a centroid 55 of the image constituted with the extracted pixels.

Figure 12:
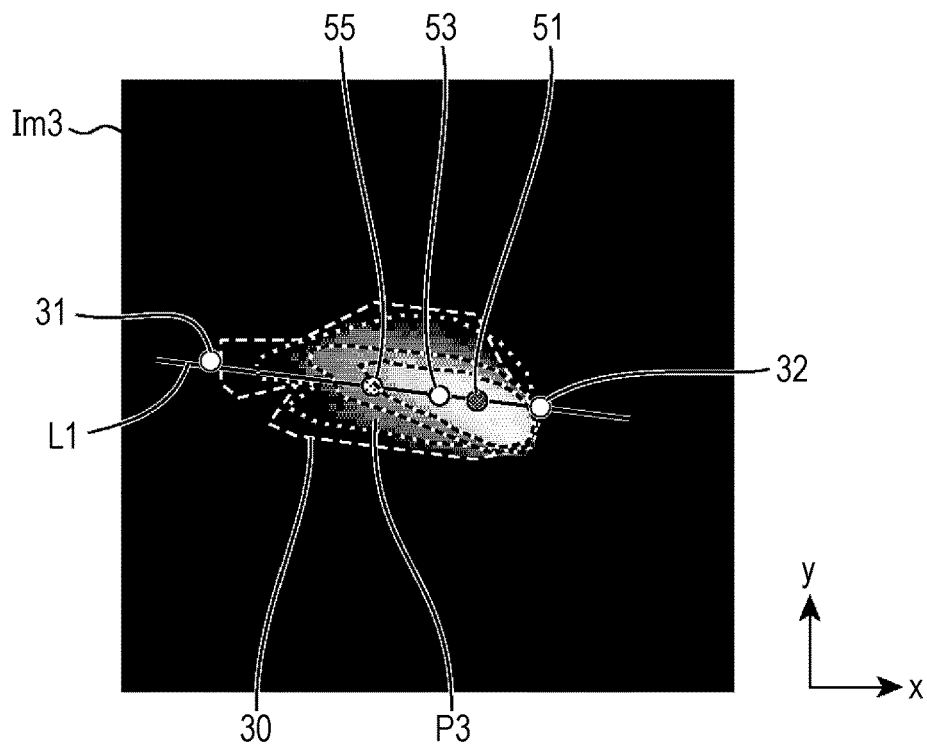
FIG. 12 is an image diagram illustrating a relationship between cumulative gas region images and pixels indicating feature points in a second modification.

The arithmetic control unit 8 uses the centroids 51, 53, and 55 to determine the pixels indicating the feature points. Specifically, FIG. 12 is an image diagram illustrating a relationship between the cumulative gas region image P3 and the pixels indicating the feature points (the first pixel 31 and the second pixel 32) in the second modification. The arithmetic control unit 8 functions as a second calculation unit and calculates the regression line L2 indicating a relationship between positions of the three centroids 51, 53, and 55. The regression line L2 is calculated using the least squares method. That is, the arithmetic control unit 8 assigns the coordinate values (xi, yi) of each of the three centroids 51, 53, and 55 into the linear function y=ax+b, and calculates the gradient a and the intercept b. A linear function having the calculated gradient a and intercept b is the regression line L2.

The arithmetic control unit 8 functions as the first determination unit. The arithmetic control unit 8 (first determination unit) performs processing of superimposing the regression line L2 on the cumulative gas region image P3 and obtains two points at which the outline 30 of the cumulative gas region image P3 and the regression line L2 intersect with each other. The pixel indicating one of the two points is defined as a first pixel 31 and the pixel indicating the other of the two points is defined as a second pixel 32. Each of the first pixel 31 and the second pixel 32 is a pixel indicating a feature point.

Similarly to the arithmetic control unit 8 according to the present embodiment, the arithmetic control unit 8 determines a gas leak estimated position (step S6 in FIG. 2). A pixel indicating the centroid 51 may be used as the pixel-of-interest 33 (FIG. 5) used for this determination. Among the pixel indicating the centroid 51, the pixel indicating the centroid 53, and the pixel indicating the centroid 55, the pixels having the largest pixel value are the pixel indicating the centroid 51. Since the pixel-of-interest 33 is a pixel corresponding to a position where gas appears at a high frequency, the pixel indicating the centroid 51 is the pixel-of-interest 33.

The second modification defines pixels indicating two points at which the outline 30 of the cumulative gas region image P3 and the regression line L2 intersect with each other (the first pixel 31 and the second pixel 32) as pixels indicating the feature points of the cumulative gas region image P3 so as to narrow down the number of pixels serving as the feature points of the cumulative gas region image P3 from among the plurality of pixels constituting the outline 30 of the cumulative gas region image P3. As described with reference to FIG. 4, while there is the regression line L1 (that is, the regression line L1 indicating a relationship between individual positions of the plurality of pixels constituting the cumulative gas region image P3 (gas region image) calculated on the basis of the cumulative gas region image P3, the second modification calculates the regression line L2 on the basis of the cumulative image Im3.

A third modification will be described. In the third modification, the processing of step S6 is different from the present embodiment. In the present embodiment, as illustrated in FIG. 5, a pixel closer to the pixel-of-interest 33 among the first pixel 31 or the second pixel 32 is determined as the pixel indicating the gas leak estimated position. In contrast, in third modification, one of the first pixel 31 and the second pixel 32 is determined as the pixel indicating the gas leak estimated position on the basis of the density of the gas.

Figure 13:
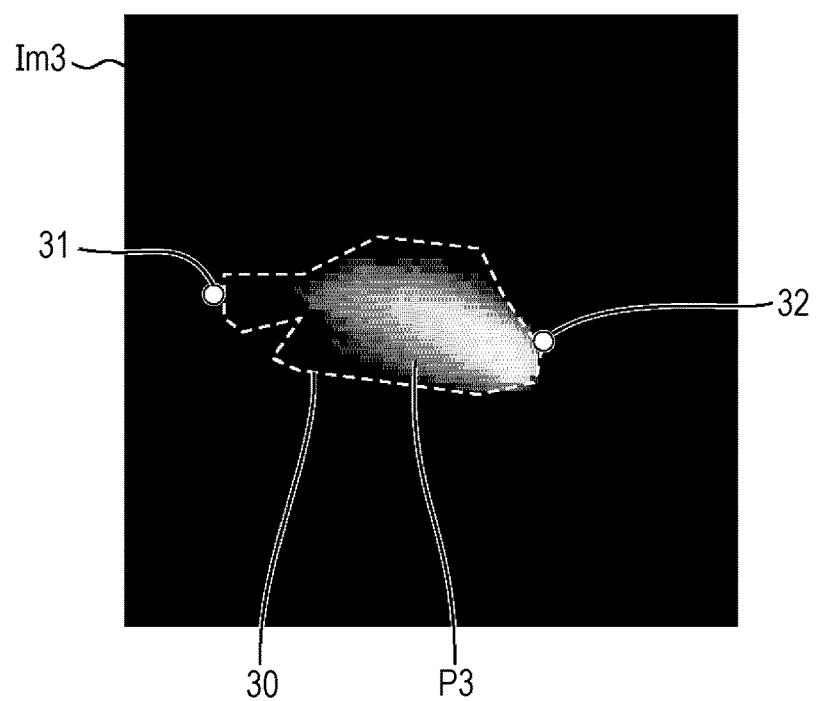
FIG. 13 is an image diagram illustrating a relationship between cumulative gas region images and pixels indicating feature points in a third modification.

FIG. 13 is an image diagram illustrating a relationship between the cumulative gas region image P3 and pixels indicating the feature points (the first pixel 31 and the second pixel 32) in third modification, and corresponds to FIG. 5. The first pixel 31 or the second pixel 32 is pixel indicating the gas leak estimated position. When the density of the gas is lower than the density of the air (for example, methane gas), the gas leaking from the monitoring target W (FIG. 1) flows from the bottom to the top. In contrast, when the density of the gas is higher than the density of the air (for example, chlorofluorocarbons), the gas leaking from the monitoring target W (FIG. 1) flows from the top to the bottom.

The arithmetic control unit 8 functions as the second determination unit. When the density of the gas is lower than the density of the air, the arithmetic control unit 8 (second determination unit) determines a pixel located at a lower position among the first pixel 31 and the second pixel 32 as the pixel indicating the gas leak estimated position. When the density of the gas is higher than the density of the air, the arithmetic control unit 8 determines the pixel located at a higher position among the first pixel 31 and the second pixel 32 as the pixel indicating the gas leak estimated position.

In FIG. 13, the position of the first pixel 31 is higher than the position of the second pixel 32. When the density of the gas is lower than the density of the air, the arithmetic control unit 8 determines the second pixel 32 as a pixel indicating the gas leak estimated position. When the density of the gas is higher than the density of the air, the arithmetic control unit 8 determines the first pixel 31 as the pixel indicating the gas leak estimated position.

Fourth to sixth modifications will be described. In these modifications, the processing of step S6 illustrated in FIG. 2 is different from the present embodiment. The leakage gas hangs so as to spread. On the basis of this, the fourth to sixth modifications determine one pixel among the first pixel 31 or the second pixel 32 as a pixel indicating the gas leak estimated position.

Figure 14:
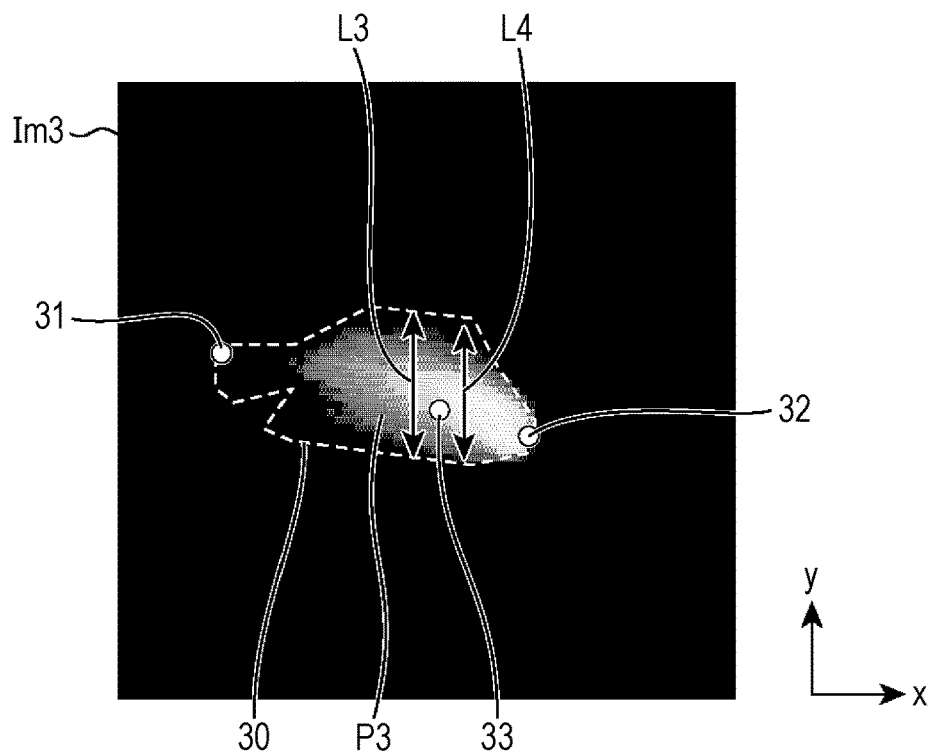
FIG. 14 is an image diagram illustrating a relationship between cumulative gas region images and pixels indicating feature points in a fourth modification.

In the fourth modification, the spread of the leakage gas is judged by two line segments. FIG. 14 is an image diagram illustrating a relationship between the cumulative gas region image P3 and pixels indicating the feature points (first pixel 31, second pixel 32) in the fourth modification, and corresponds to FIG. 5.

A first line segment L3 is one of two line segments intersecting with a line (not illustrated) connecting the first pixel 31 and the second pixel 32 and having both ends located on the outline 30. The first line segment L3 is located between the first pixel 31 and the pixel-of-interest 33. A second line segment L4 is the other of the two line segments intersecting with the above-described line (not illustrated) and having both ends located on the outline 30. The second line segment L4 is located between the second pixel 32 and the pixel-of-interest 33. The first line segment L3 and the second line segment L4 are parallel to each other. The first line segment L3 and the second line segment L4 pass the vicinity of the pixel-of-interest 33. For example, the first line segment L3 and the second line segment L4 pass through a position two pixels away from the pixel-of-interest 33.

The cumulative gas region image P3 (gas region image) is shorter in the y direction than in the x direction. The directions of the first line segment L3 and the second line segment L4 are the y directions. Note that the directions of the first line segment L3 and the second line segment L4 may be the direction of the short side of the circumscribed rectangle R (FIGS. 7 and 8).

Gas that has leaked from the monitoring target W (FIG. 1) hangs so as to spread. The arithmetic control unit 8 functions as the second determination unit. When the first line segment L3 is shorter than the second line segment L4, the arithmetic control unit 8 (second determination unit) regards the gas to be spreading from the first line segment L3 side toward the second line segment L4 side and determines the first pixel 31 positioned on the first line segment L3 side as a pixel indicating the gas leak estimated position. When the second line segment L4 is shorter than the first line segment L3, the arithmetic control unit 8 regards the gas to be spreading from the second line segment L4 side toward the first line segment L3 side and determines the second pixel 32 positioned on the second line segment L4 side as the pixel indicating the gas leak estimated position. In FIG. 14, since the second line segment L4 is shorter than the first line segment L3, the second pixel 32 is defined as the pixel indicating the gas leak estimated position.

Figure 15:
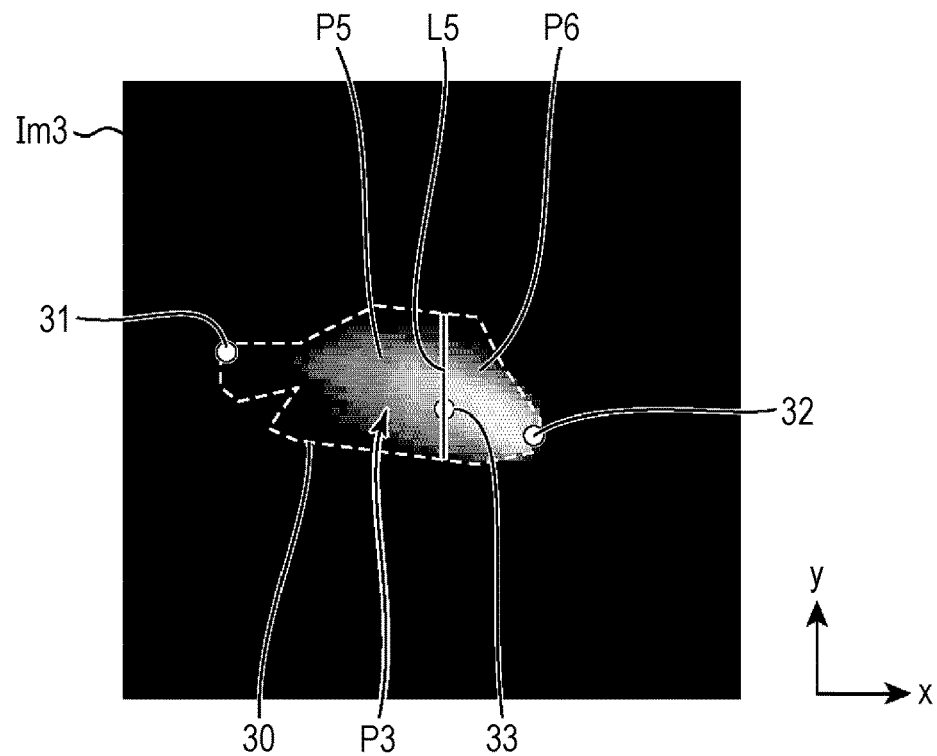
FIG. 15 is an image diagram illustrating a relationship between cumulative gas region images and pixels indicating feature points in a fifth modification.

In the fifth modification, the spread of the leakage gas is judged by the area of the two divided images. FIG. 15 is an image diagram illustrating a relationship between the cumulative gas region image P3 and pixels indicating the feature points (first pixel 31, second pixel 32) in the fifth modification, and corresponds to FIG. 5.

A dividing line L5 intersects with a line (not illustrated) connecting the first pixel 31 and the second pixel 32 and passes through the pixel-of-interest 33. The cumulative gas region image P3 (gas region image) is shorter in the y direction than in the x direction. The direction of the dividing line L5 is the y direction. The direction of the dividing line L5 may be the short side direction of the circumscribed rectangle R (FIGS. 7 and 8). A first divided image P5 is one of the two divided images formed by dividing the cumulative gas region image P3 (gas region image) into two by the dividing line L5 and includes the first pixel 31. A second divided image P6 is the other of the two divided images formed by dividing the cumulative gas region image P3 (gas region image) into two by the dividing line L5 and includes the second pixel 32.

Gas that has leaked from the monitoring target W (FIG. 1) hangs so as to spread. The arithmetic control unit 8 functions as the second determination unit. When the area of the first divided image P5 is smaller than the area of the second divided image P6, the arithmetic control unit 8 (second determination unit) regards the gas to be spreading from the first divided image P5 side to the second divided image P6 side and determines that first pixel 31 included in the first divided image P5 as a pixel indicating the gas leak estimated position. When the area of the second divided image P6 is smaller than the area of the first divided image P5, the arithmetic control unit 8 regards the gas to be spreading from the second divided image P6 side toward the first divided image P5 side and determines the second pixel 32 included in the second divided image P6 as the pixel indicating the gas leak estimated position. In FIG. 15, since the area of the second divided image P6 is smaller than the area of the first divided image P5, the second pixel 32 is defines as the pixel indicating the gas leak estimated position.

Figure 16:
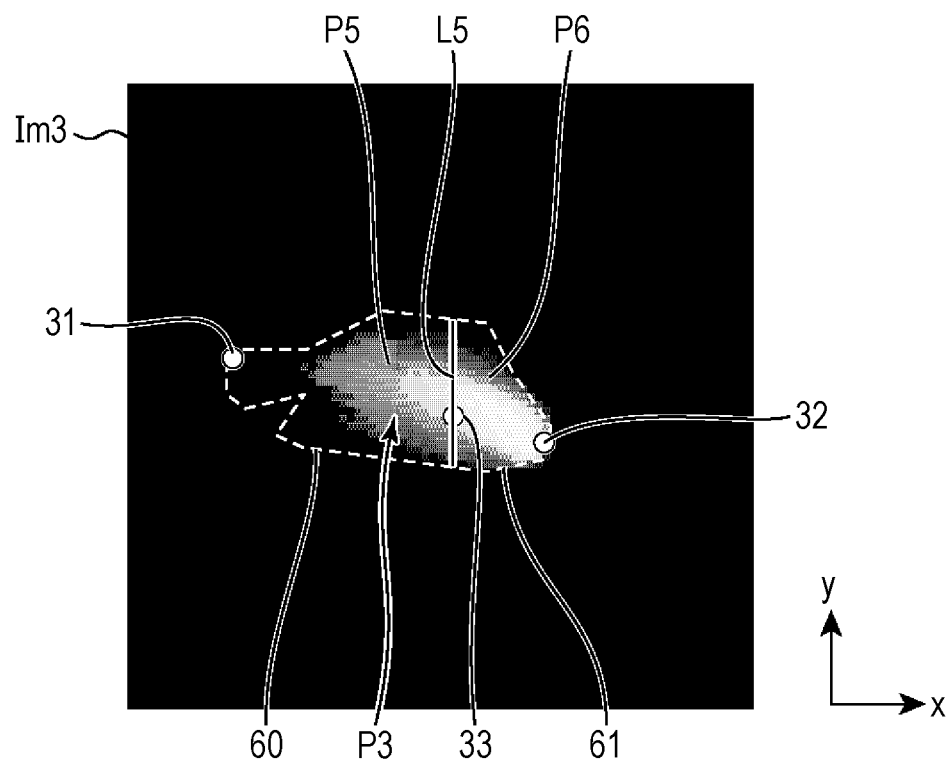
FIG. 16 is an image diagram illustrating a relationship between cumulative gas region images and pixels indicating feature points in a sixth modification.

In the sixth modification, the spread of the gas that has leaked from the monitoring target W (FIG. 1) is judged by the length of the outline of the two divided images. FIG. 16 is an image diagram illustrating a relationship between the cumulative gas region image P3 and pixels indicating the feature points (first pixel 31, second pixel 32) in the sixth modification, and corresponds to FIG. 5. FIG. 16 is different from FIG. 15 in that an outline 60 of the first divided image P5 and an outline 61 of the second divided image P6 are illustrated instead of the outline 30 of the cumulative gas region image P3. This is because the outline 30 (FIG. 15) of the cumulative gas region image P3 overlaps with the outline 60 of the first divided image P5 and the outline 61 of the second divided image P6.

Gas that has leaked from the monitoring target W (FIG. 1) hangs so as to spread. The arithmetic control unit 8 functions as the second determination unit. When the outline 60 of the first divided image P5 is smaller than the outline 61 of the second divided image P6, the arithmetic control unit 8 (second determination unit) regards the gas to be spreading from the first divided image P5 side to the second divided image P6 side and determines that first pixel 31 included in the outline 60 of the first divided image P5 as a pixel indicating the gas leak estimated position. When the outline 61 of the second divided image P6 is smaller than the outline 60 of the first divided image P5, the arithmetic control unit 8 regards the gas to be spreading from the second divided image P6 side toward the first divided image P5 side and determines the second pixel 32 included in the outline 61 of the second divided image P6 as the pixel indicating the gas leak estimated position. In FIG. 16, since the outline 61 of the second divided image P6 is smaller than the outline 60 of the first divided image P5, the second pixel 32 is defined as the pixel indicating the gas leak estimated position.

A seventh modification will be described. Referring to FIG. 5, in the present embodiment and the first to sixth modifications, the pixel indicating the gas leak estimated position is assumed to be located in a plurality of pixels constituting the outline 30 of the cumulative gas region image P3 (gas region image) and determines the pixels indicating the feature points (the first pixel 31 and the second pixel 32) among the plurality of pixels constituting the outline 30, and then determines the first pixel 31 or the second pixel 32 as the pixel indicating the gas leak estimated position.

The cumulative gas region image P3 is included in the cumulative image Im3. As illustrated in FIG. 3, the cumulative image Im3 is generated by using a plurality of frames aligned in time series, that is, a frame group of a predetermined period. When the wind direction changes during a predetermined period, there is a possibility that the pixel indicating the gas leak estimated position is not included in the plurality of pixels constituting the outline 30 of the cumulative gas region image P3 (gas region image). As a result, the gas leak estimated position might be separated from the gas leak position.

Figure 17:
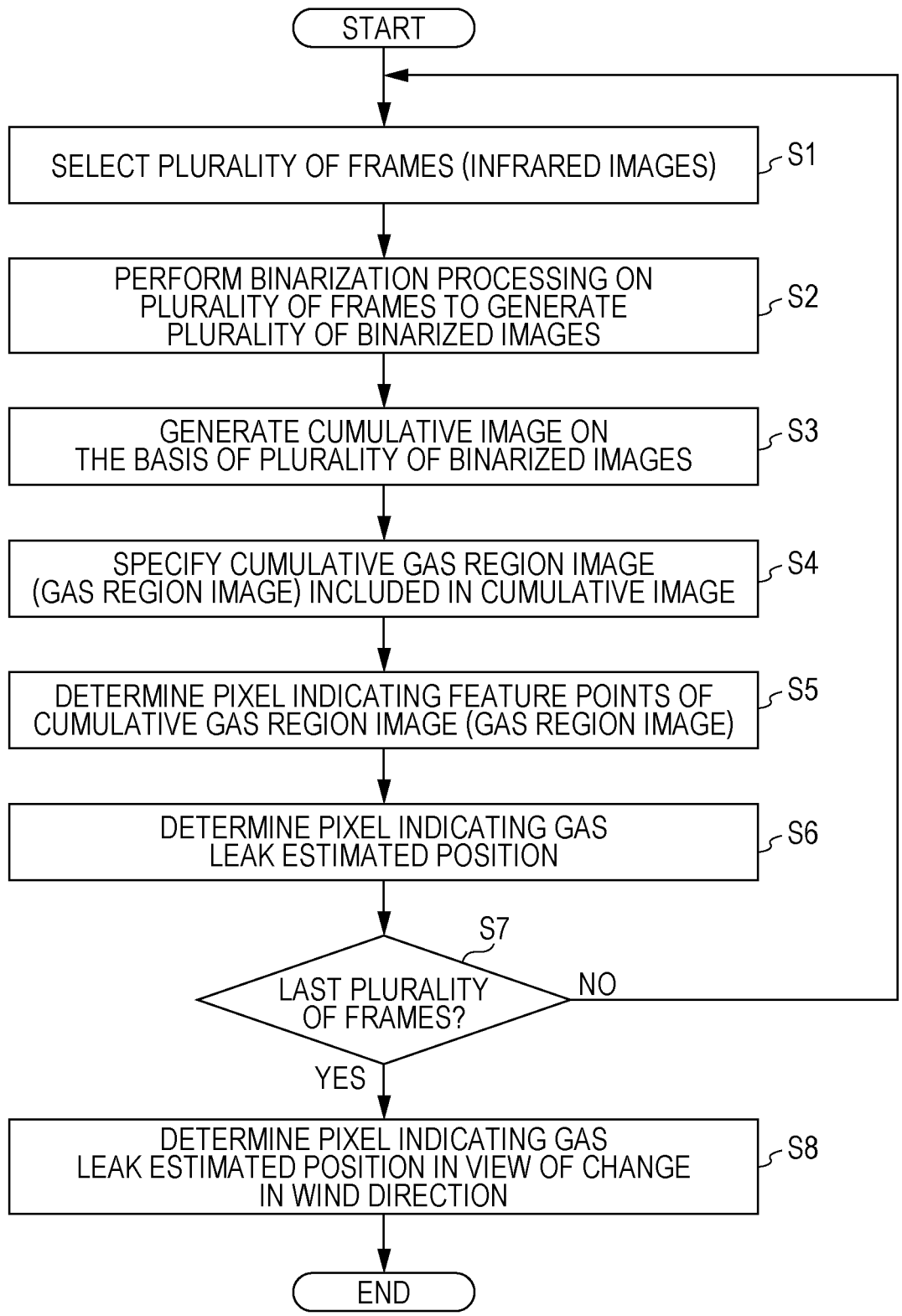
FIG. 17 is a flowchart for illustrating operation of a seventh modification.
Figure 18:
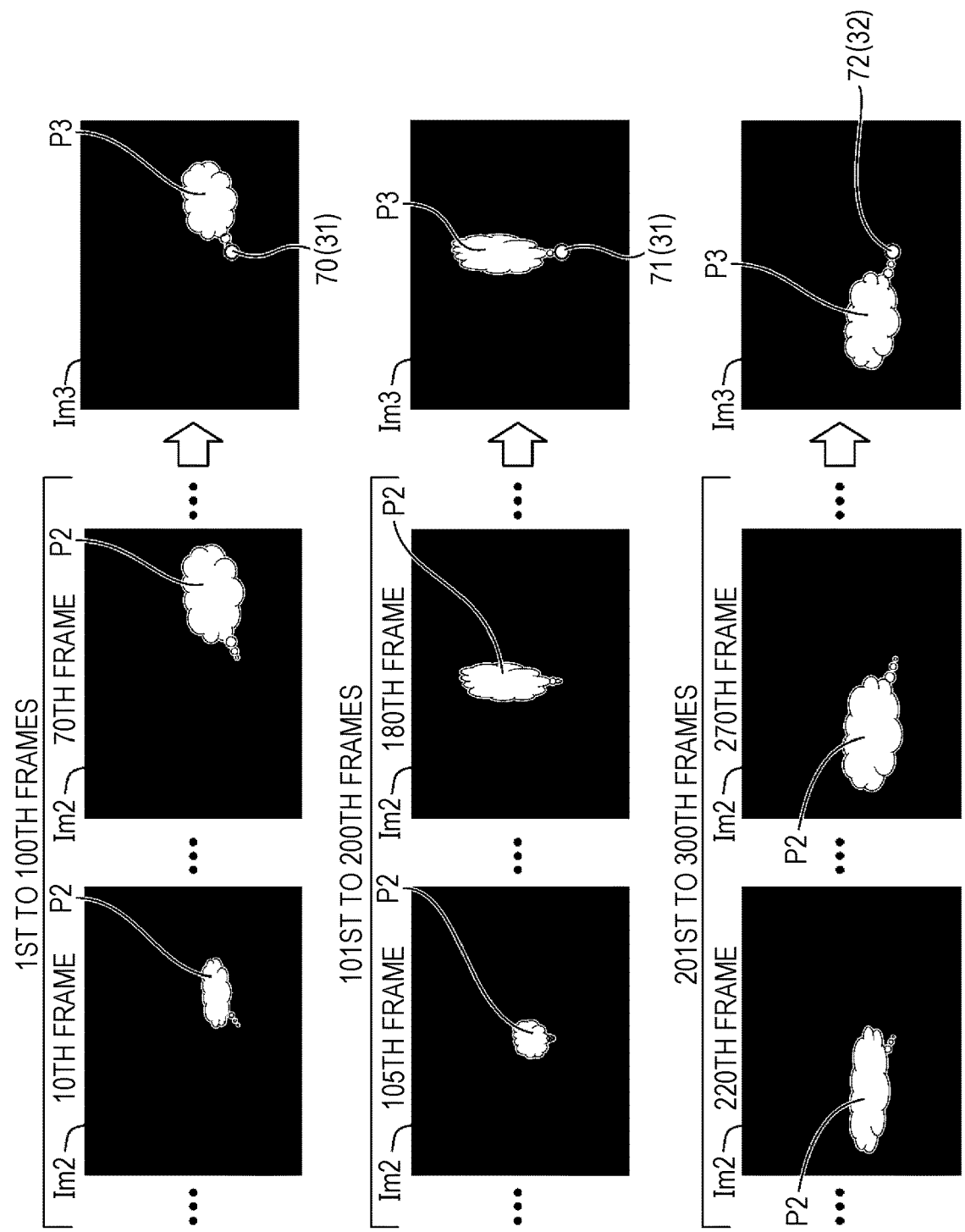
FIG. 18 is an image diagram illustrating a relationship between a binarized image and a cumulative image in the seventh modification.

Therefore, the seventh modification determines the pixel indicating the gas leak estimated position in consideration of the change in the wind direction. Operation of the seventh modification will be described with reference to FIGS. 17 and 18. FIG. 17 is a flowchart illustrating operation of the seventh modification. FIG. 18 is an image diagram illustrating a relationship between the binarized image Im2 and the cumulative image Im3 in the seventh modification.

Step S1 is the same as step S1 illustrated in FIG. 2, and thus, description thereof is omitted. In the case of the present embodiment and the first to sixth modifications, the arithmetic control unit 8 selects 300 frames in step S1. In the case of the seventh modification, however, the arithmetic control unit 8 equally divides 300 frames into three and initially selects first to 100th frames (step S1). This will be described in detail with reference to FIG. 18.

In the present embodiment and the first to sixth modifications, the cumulative image Im3 is generated using a frame group of 10 seconds assuming that the predetermined period is 10 seconds. In the seventh modification, the predetermined period is divided into a plurality of periods, and in each of the plurality of divided periods, the cumulative image Im3 is generated using the frame group in the divided period. When the frame rate is 30 fps, the frame group of 10 seconds is constituted with 300 frames. For example, when 10 seconds are equally divided into three, 300 frames are divided into 1st to 100th frames (100 frames), 101st to 200th frames (100 frames), and 201st to 300th frames (100 frames).

The arithmetic control unit 8 performs steps S2 to S6 using the first to 100th frames selected in step S1 to determine a pixel 70 indicating a gas leak estimated position. Steps S2 to S6 are the same as steps S2 to S6 illustrated in FIG. 2, and thus, the description thereof will be omitted. The pixel 70 indicating the gas leak estimated position is selected from the first pixel 31 or the second pixel (not illustrated), and herein, it is assumed that the first pixel 31 is selected.

The arithmetic control unit 8 judges whether the plurality of frames selected in step S1 are the last (step S7). The last plurality of frames corresponds to the 201st to 300th frames. In step S1, the first to 100th frames are selected. The arithmetic control unit 8 judges that the plurality of frames selected in step S1 is not the last (No in step S7), and the arithmetic control unit 8 returns to step S1 and selects the 101st to 200th frames.

The arithmetic control unit 8 performs steps S2 to S6 using the 101st to 200th frames selected in step S1 to determine a pixel 71 indicating a gas leak estimated position. The pixel 71 indicating the gas leak estimated position is selected from the first pixel 31 or the second pixel (not illustrated), and herein, it is assumed that the first pixel 31 is selected.

The arithmetic control unit 8 judges whether the plurality of frames selected in step S1 are the last (step S7). In step S1, the 101st to 200th frames are selected. The arithmetic control unit 8 judges that the plurality of frames selected in step S1 is not the last (No in step S7), and the arithmetic control unit 8 returns to step S1 and selects the 201st to 300th frames.

The arithmetic control unit 8 performs steps S2 to S6 using the 201st to 300th frames selected in step S1 to determine a pixel 72 indicating the gas leak estimated position. The pixel 72 indicating the gas leak estimated position is selected from the first pixel (not illustrated) or the second pixel 32, and herein, it is assumed that the second pixel 32 is selected.

Since the wind direction has changed in 10 seconds, the shapes and positions of the cumulative gas region images P3 are different from each other among the cumulative image Im3 generated using the 1st to 100th frames, the cumulative image Im3 generated using the 101st to 200th frames, and the cumulative image Im3 generated using the 201st to 300th frames.

Figure 19:
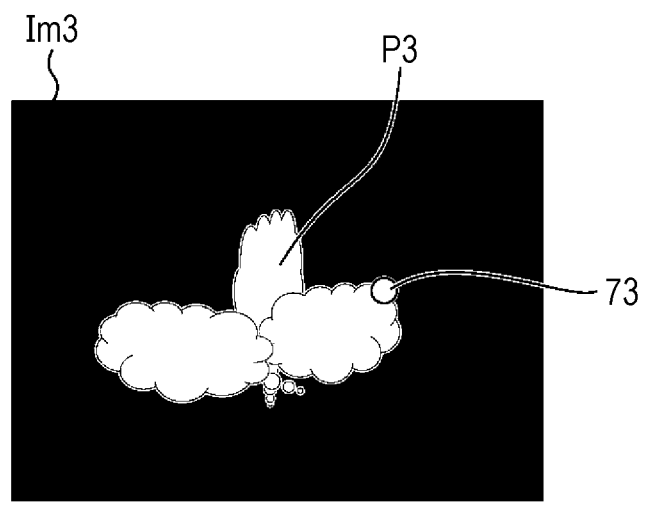
FIG. 19 is an image diagram illustrating cumulative images generated using the first to 300th frames illustrated in FIG. 18.
Figure 20:
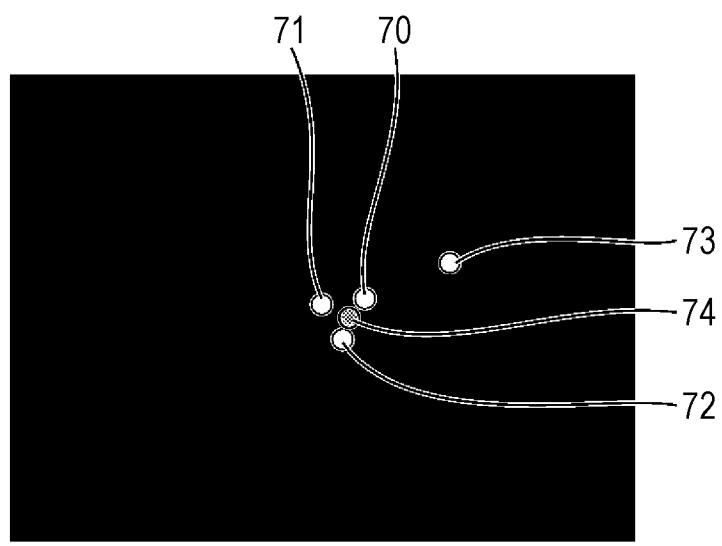
FIG. 20 is an explanatory diagram for illustrating a positional relationship among a plurality of pixels indicating gas leak estimated positions.

The arithmetic control unit 8 judges that the plurality of frames selected in step S1 is the last (Yes in step S7) and performs step S8. This processing will be described in detail. FIG. 19 is an image diagram illustrating the cumulative image Im3 generated using the first to 300th frames illustrated in FIG. 18. FIG. 19 illustrates a pixel 73 indicating a gas leak estimated position determined using the cumulative image Im3. FIG. 20 is an explanatory diagram illustrating a positional relationship between the pixels 70, 71, 72, and 73 indicating the gas leak estimated positions. The pixels 70, 71, 72 indicating the gas leak estimated position are close to each other. Since the cumulative image Im3 used for determining each of these pixels is generated using a relatively small number (100) of frames, that is, generated using a frame group of a relatively short period (about 3.3 seconds), leading to a small influence of a change in the wind direction.

In contrast, the pixel 73 indicating the gas leak estimated position is separated away from the pixels 70, 71, and 72 indicating the gas leak estimated positions. Since the cumulative image Im3 used for determining this pixel is generated using a relatively large number (300) of frames, that is, it is generated using a frame group of a relatively long period (10 seconds), leading to a great influence of a change in the wind direction.

Therefore, the gas leak estimated position indicated by the pixel 73 is separated away from the gas leak position, and it is reasonable to consider that the gas leak estimated positions indicated by the pixels 70, 71, and 72 are close to the gas leak position. Therefore, the seventh modification determines a pixel 74 indicating a gas leak estimated position in consideration of the change in the wind direction on the basis of the pixels 70, 71, and 72 indicating the gas leak estimated positions (step S8).

Specifically, the arithmetic control unit 8 functions as the second determination unit. The arithmetic control unit 8 (second determination unit) determines the pixels indicating the gas leak estimated positions (pixel 70, pixel 71, and pixel 72) for each of the three cumulative gas region images P3 (plurality of gas region images aligned in time series) illustrated in FIG. 18 (step S6). The arithmetic control unit 8 sets the pixels indicating the plurality of gas leak estimated positions determined in step S6 (pixel 70, pixel 71, and pixel 72) as the pixels indicating a plurality of first gas leak estimated positions, then, sets each of coordinate values of the pixels indicating the plurality of first gas leak estimated positions as a population, and determines a pixel indicating a coordinate value of an average value or a median value of the population as a pixel indicating a second gas leak estimated position. The pixel indicating the second gas leak estimated position is the pixel 74 indicating the gas leak estimated position in consideration of the change in the wind direction.

As described above, the pixel 74 indicating the second gas leak estimated position is determined on the basis of the pixels indicating the plurality of first gas leak estimated positions 70, 71, and 72. The pixels 70, 71 and 72 indicating the plurality of first gas leak estimated positions are pixels indicating gas leak estimated positions obtained from each of the plurality of cumulative gas region images P3 (gas region images) aligned in time series. Therefore, the second gas leak estimated position is a gas leak estimated position with little influence of change in the wind direction. That is, the second gas leak estimated position is a gas leak estimated position that is not separated away from the gas leak position even with the change in the wind direction. Therefore, according to the seventh modification, it is possible to prevent deterioration of accuracy of the gas leak estimated position even with the change in the wind direction.

The coordinate value that is the average value of the population and the coordinate value that is the median value of the population will be specifically described. The coordinate value of the pixel 70 indicating the first gas leak estimated position is defined as (x1, y1), the coordinate value of the pixel 71 indicating the first gas leak estimated position is defined as (x2, y2), the coordinate value of the pixel 72 indicating the first gas leak estimated position is defined as (x3, y3), in which x2<x3<x1, and y1<y2<y3 are established. The coordinate values that are the average values of the population are obtained by: ((x1+x2+x3)/3, (y1+y2+y3)/3). The coordinate value that is the median value of the population is (x3, y2).

An eighth modification will be described. As illustrated in FIG. 17, the seventh modification determines a pixel indicating a gas leak estimated position in consideration of the change in the wind direction on the basis of the pixels indicating the plurality of gas leak estimated positions determined in step S6 (step S8). In contrast, the eighth modification determines a pixel indicating a gas leak estimated position in consideration of the change in the wind direction on the basis of the pixels indicating the plurality of feature points determined in step S5 (step S8).

Figure 21:
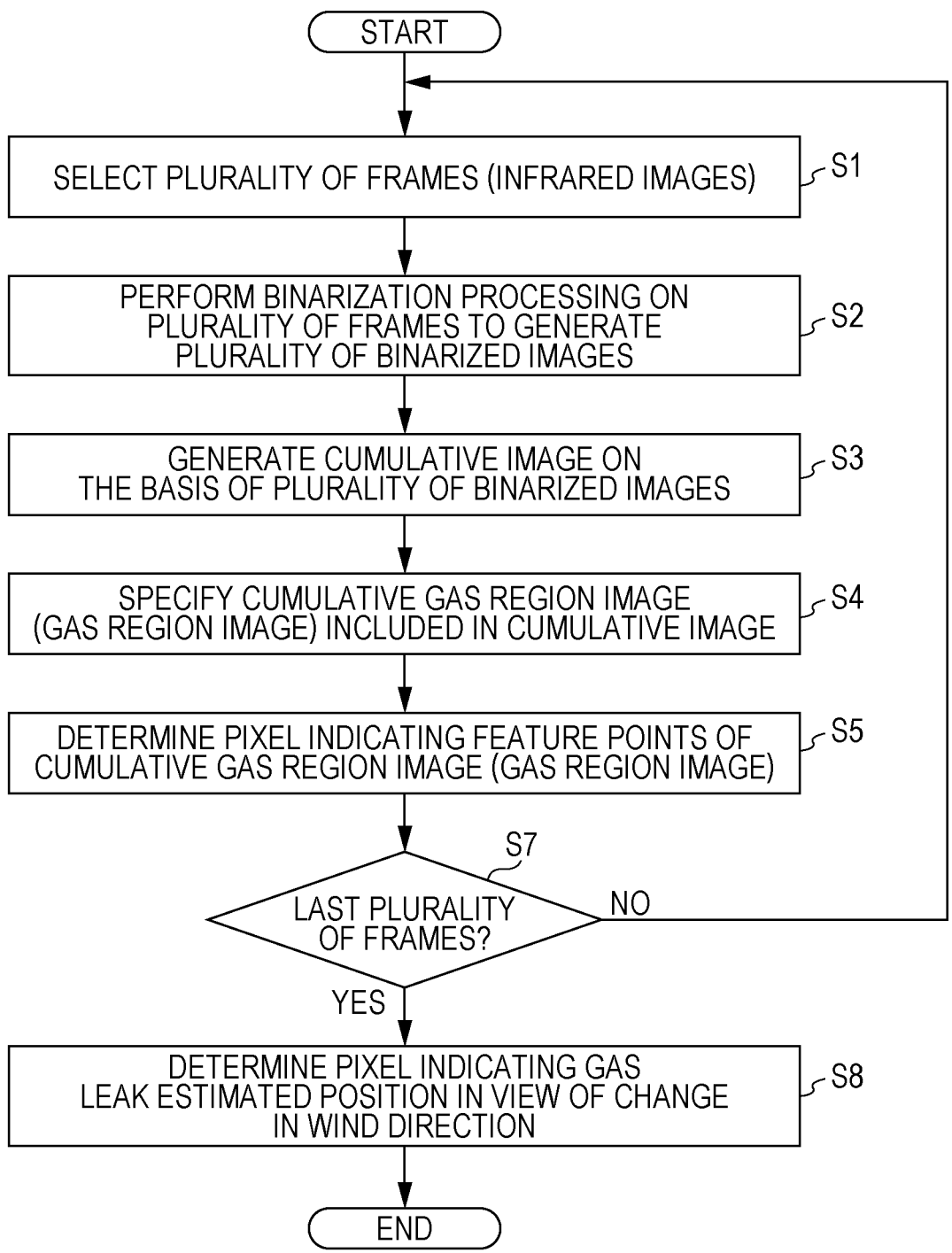
FIG. 21 is a flowchart illustrating operation of an eighth modification.
Figure 22:
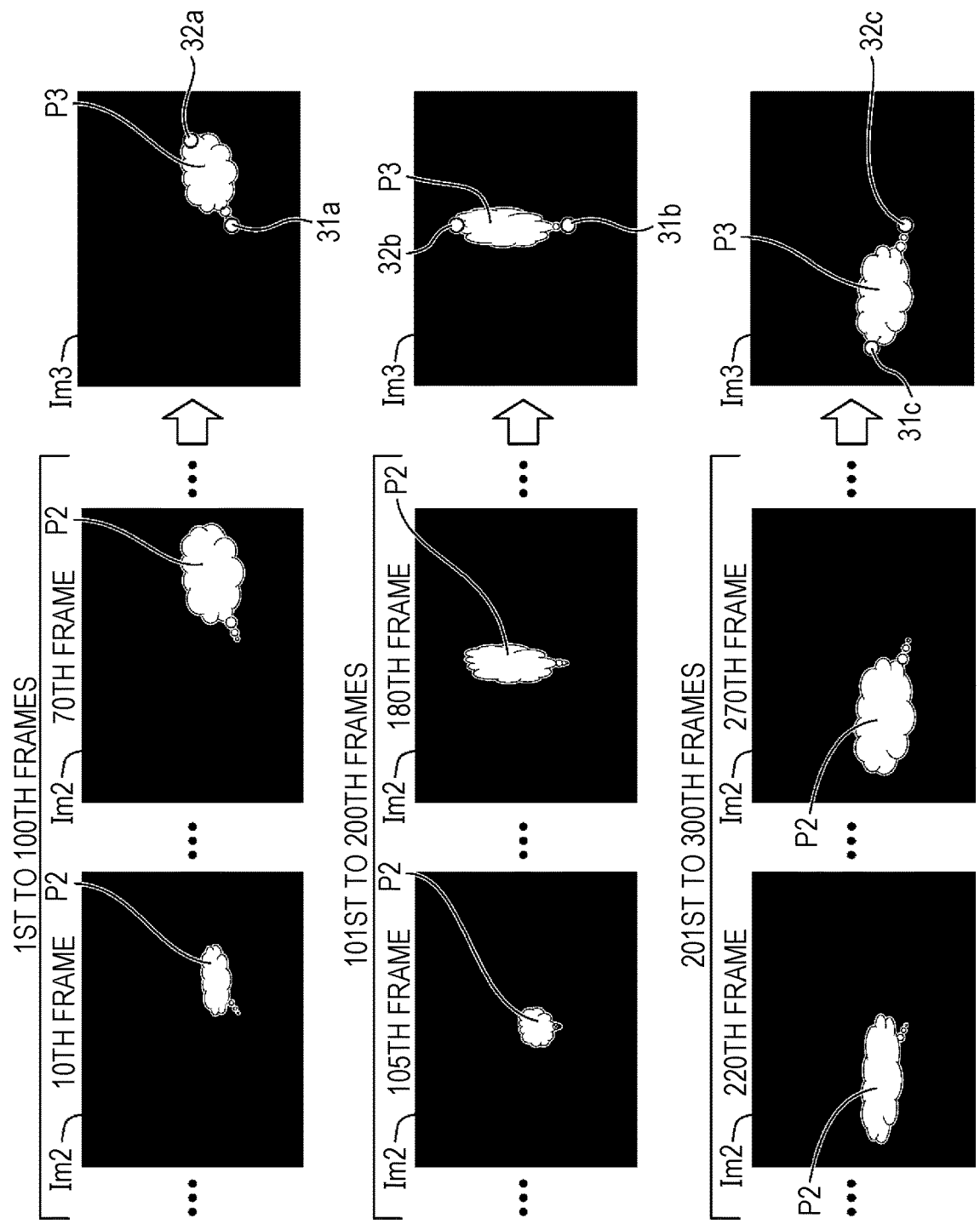
FIG. 22 is an image diagram illustrating a relationship between a binarized image and a cumulative image in the eighth modification.

Operation of the eighth modification will be described with reference to FIGS. 21 and 22. FIG. 21 is a flowchart illustrating operation of the eighth modification. FIG. 22 an image diagram illustrating a relationship between the binarized image Im2 and the cumulative image Im3 in the eighth modification.

Step S1 is the same as step S1 illustrated in FIG. 2, and thus, description thereof is omitted. The arithmetic control unit 8 selects the first to 100th frames similarly to the seventh modification (step S1).

The arithmetic control unit 8 performs steps S2 to S5 using the first to 100th frames selected in step S1 to determine pixels indicating feature points (a first pixel 31a and a second pixel 32a). Steps S2 to S5 are the same as steps S2 to S5 illustrated in FIG. 2, and description thereof will be omitted.

The arithmetic control unit 8 judges whether the plurality of frames selected in step S1 are the last (step S7). The last plurality of frames corresponds to the 201st to 300th frames. In step S1, the first to 100th frames are selected. The arithmetic control unit 8 judges that the plurality of frames selected in step S1 is not the last (No in step S7), and the arithmetic control unit 8 returns to step S1 and selects the 101st to 200th frames.

The arithmetic control unit 8 performs steps S2 to S5 using the 101st to 200th frames selected in step S1 to determine pixels indicating feature points (a first pixel 31b and a second pixel 32b).

The arithmetic control unit 8 judges whether the plurality of frames selected in step S1 are the last (step S7). In step S1, the 101st to 200th frames are selected. The arithmetic control unit 8 judges that the plurality of frames selected in step S1 is not the last (No in step S7), and the arithmetic control unit 8 returns to step S1 and selects the 201st to 300th frames.

The arithmetic control unit 8 performs steps S2 to S5 using the 201st to 300th frames selected in step S1 to determine pixels indicating feature points (a first pixel 31c and a second pixel 32c).

Figure 23:
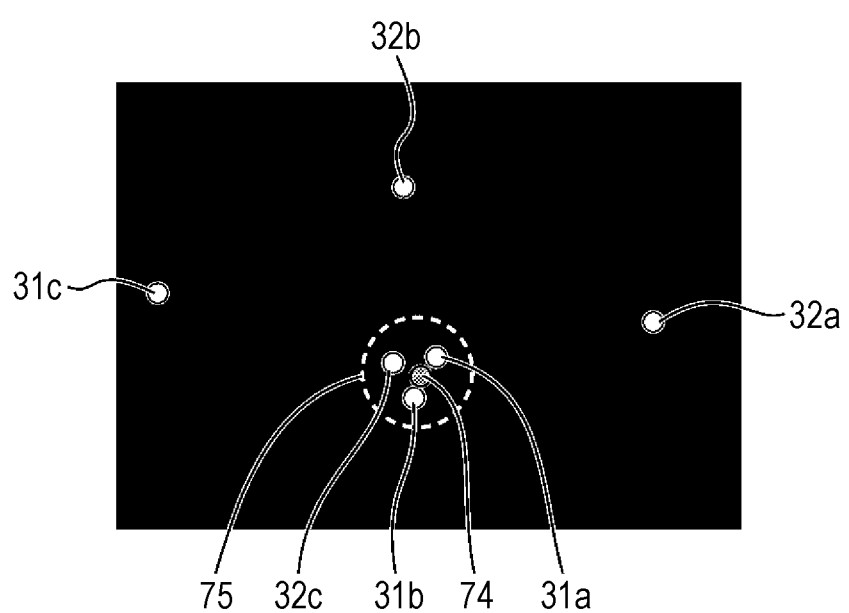
FIG. 23 is an explanatory diagram illustrating a positional relationship of pixels indicating feature points in the eighth modification.

The arithmetic control unit 8 judges that the plurality of frames selected in step S1 is the last (Yes in step S7) and performs step S8. This processing will be described in detail. FIG. 23 is an explanatory diagram illustrating a positional relationship of pixels indicating feature points. Among the six pixels indicating feature points (the first pixel 31a, the second pixel 32a, the first pixel 31b, the second pixel 32b, the first pixel 31c, and second pixel 32c), the first pixel 31a, the first pixel 31b, and the second pixel 32c are close to each other. The second pixel 32a, the second pixel 32b, and the first pixel 31c are located at isolated positions. Therefore, accuracy of the gas leak estimated position is considered to be higher in a case where the pixel indicating the gas leak estimated position in consideration of the change in the wind direction is determined on the basis of the first pixel 31a, the first pixel 31b, and the second pixel 32c located close to each other rather than in a case where the pixels indicating the gas leak estimated position in consideration of the change in the wind direction is determined on the basis of the six pixels indicating the feature points.

Accordingly, the eighth modification defines the first pixel 31a, the first pixel 31b, and the second pixel 32c positioned close to each other as pixels within a range in which feature points concentrate, and determines the pixel 74 indicating the gas leak estimated position in consideration of the change in the wind direction on the basis of these pixels (step S8). The arithmetic control unit 8 functions as the second determination unit. The arithmetic control unit 8 (second determination unit) specifies the pixels within the predetermined range 75 (the first pixel 31a, the first pixel 31b, and the second pixel 32c) from among the pixels indicating the plurality of feature points determined in step S5 (the first pixel 31a, the second pixel 32a, the first pixel 31b, the second pixel 32b, the first pixel 31c, and the second pixel 32c). The arithmetic control unit 8 sets each of coordinate values of the specified pixels as a population and determines the pixel indicating the average value or the median value of the population as the pixel indicating the gas leak estimated position. This pixel is the pixel 74 indicating the gas leak estimated position in consideration of the change in the wind direction. Therefore, according to the eighth modification, it is possible to prevent deterioration of accuracy of the gas leak estimated position even with the change in the wind direction.

The seventh modification and the eighth modification use an example of dividing 300 frames into three. Alternatively, however, the frames may be divided into two or may be divided finer than three divisions with upper limit of 300 divisions. In the case of 300 division, the seventh modification would determine a pixel indicating the gas leak estimated position for each of the frames, and the eighth modification would determine the pixel indicating the feature point for each of the frames.

Combinations of modifications are also possible. For example, it is allowable to use a combination in which the second modification illustrated in FIG. 12 determines the pixels indicating the feature points (the first pixel 31 and the second pixel 32) and the third modification illustrated in FIG. 13 determines the pixel indicating the gas leak estimated position.

Summary of Embodiments

A gas leak position estimation device according to a first aspect of the embodiment includes: a specifying unit that specifies a gas region image indicating a region in which gas hangs within an image obtained by photographing a monitoring region; and a first determination unit that determines a pixel indicating a gas leak estimated position estimated as a position of gas leak from among a plurality of pixels constituting an outline of the gas region image.

Since the gas region image is an image indicating a region in which the gas hangs, the gas region image includes the gas leak position. The inventors of the present invention found that the gas leaking from the monitoring region (also referred to as a monitoring target) is fluctuated by wind or the like, and that the gas leak position is likely to be present in the outline of the gas region image or in the vicinity thereof. From this findings, the present inventors considered that it is appropriate to determine a certain position on the outline of the gas region image as the gas leak estimated position. Therefore, the gas leak position estimation device according to the first aspect of the embodiment determines the pixel indicating the gas leak estimated position from among the plurality of pixels constituting the outline of the gas region image. Accordingly, with the gas leak position estimation device according to the first aspect of the present embodiment, it is possible to estimate the gas leak position using the gas region image.

In the above-described configuration, the first determination unit determines a pixel indicating a feature point of the gas region image from among a plurality of pixels constituting the outline of the gas region image, and determines a pixel indicating the gas leak estimated position from among the feature points.

The inventors of the present invention consider that the pixel indicating the feature point of the gas region image among the plurality of pixels constituting the outline of the gas region image has a higher possibility of being the pixel indicating the gas leak estimated position rather than the pixel indicating other than the future point. Therefore, in this configuration, a pixel indicating the gas leak estimated position is determined from among the feature points.

The above-described configuration further includes a first calculation unit that calculates a regression line indicating a relationship between individual positions of a plurality of pixels constituting the gas region image, in which the first determination unit determines at least one of a first pixel and a second pixel positioned at two points at which the regression line and the outline intersect with each other as the pixel indicating the feature point.

The regression line is a line approximating the position of each of the plurality of pixels constituting the gas region image. This configuration defines at least one of the pixels indicating two points at which the regression line intersects with the outline of the gas region image (the first pixel and the second pixel) as a pixel indicating the feature point of the gas region image so as to narrow down the number of pixels serving as the feature points of the gas region image from among the plurality of pixels constituting the outline of the gas region image.

The above-described configuration further includes a setting unit that sets a circumscribed rectangle that is a rectangle having four sides being in contact with the gas region image and surrounding the gas region image, in which the first determination unit determines at least one of the first pixel and the second pixel located at two points where two short sides of the circumscribed rectangle and the gas region image come in contact with each other as the pixel indicating the feature point.

The circumscribed rectangle is a rectangle approximating a gas region image. Gas that has leaked from the monitoring region (monitoring target) tends to spread in one direction, not uniformly spreading in all directions while the wind direction is constant. Therefore, there is a high possibility that the gas leak position exists on one short side of the two short sides of the circumscribed rectangle. This configuration defines at least one of the pixels indicating two points at which the two short sides of the circumscribed rectangle and the gas region image come in contact with each other (first pixel and second pixel) as a pixel indicating the feature point of the gas region image so as to narrow down the number of pixels serving as the feature points of the gas region image from among the plurality of pixels constituting the outline of the gas region image.

In the above-described configuration, the setting unit sets the circumscribed rectangle having the minimum area among the circumscribed rectangles as the circumscribed rectangle.

It is considered preferable that the circumscribed rectangle most approximate to the gas region image among the circumscribed rectangles be set as the circumscribed rectangle. The circumscribed rectangle having the minimum area is the circumscribed rectangle most approximate to the gas region image. In this configuration, the circumscribed rectangle having the minimum area is set as the circumscribed rectangle.

The above-described configuration further includes: a first extraction unit that extracts an instantaneous gas region image indicating a region in which the gas hangs at a point of photographing each of images from among each of a plurality of the images aligned in time series; and a generation unit that performs processing of adding pixel values of pixels at a same position in a plurality of instantaneous gas region images extracted from each of the plurality of images so as to generate a cumulative gas region image which is an image obtained by accumulating the plurality of instantaneous gas region images, in which the specifying unit specifies the cumulative gas region image after the binarization processing as the gas region image.

In this configuration, an outline is specified by using a cumulative gas region image which is a type of gas region image. The pixel value may be binary or multivalued.

The above-described configuration further includes: a first extraction unit that extracts an instantaneous gas region image indicating a region in which the gas hangs at a point of photographing each of images from among each of a plurality of the images aligned in time series; a generation unit that performs processing of adding pixel values of pixels at a same position in a plurality of instantaneous gas region images extracted from each of the plurality of images so as to generate a cumulative image including a cumulative gas region image which is an image obtained by accumulating the plurality of instantaneous gas region images; a second extraction unit that performs extraction processing of extracting a pixel from a plurality of pixels constituting the cumulative image on the basis of a predetermined threshold; and a first calculation unit that performs calculation processing of calculating a centroid of an image constituted with the pixels extracted with the threshold, in which the second extraction unit performs the extraction processing on the basis of each of the two or more thresholds of different values, the first calculation unit calculates two or more centroids by performing the calculation processing on the images each corresponding to two or more of the thresholds of different values, and the gas leak position estimation device further includes a second calculation unit that calculates a regression line indicating a relationship between the individual positions of the two or more centroids, the specifying unit specifies the cumulative gas region image after the binarization processing as the gas region image, and the first determination unit determines at least one of the first pixel and the second pixel located at two points at which the regression line and the outline intersect with each other as the pixel indicating the feature point.

This configuration defines at least one of the pixels indicating two points at which the regression line intersects with the outline of the gas region image (the first pixel and the second pixel) as a pixel indicating the feature point of the gas region image so as to narrow down the number of pixels serving as the feature points of the gas region image from among the plurality of pixels constituting the outline of the gas region image. As described above, while there is a regression line calculated on the basis of the gas region image (that is, a regression line indicating a relationship between the positions of a plurality of pixels constituting the gas region image), this configuration calculates the regression line on the basis of the cumulative image.

The above-described configuration further includes a second determination unit that sets a pixel having a largest pixel value or a pixel indicating the centroid of the gas region image among the plurality of pixels constituting the gas region image as a pixel-of-interest, determines the first pixel as a pixel indicating the gas leak estimated position when a distance between the first pixel and the pixel-of-interest is shorter than a distance between the second pixel and the pixel-of-interest, and determines the second pixel as a pixel indicating the gas leak estimated position when a distance between the second pixel and the pixel-of-interest is shorter than a distance between the first pixel and the pixel-of-interest.

The pixel-of-interest is the pixel having a largest pixel value among the plurality of pixels constituting the gas region image, or the pixel indicating the centroid of the gas region image. Therefore, the gas concentration is high in a region corresponding to the pixel-of-interest among regions in which the gas leaking from the monitoring target hangs. This configuration determines a pixel closer to the pixel-of-interest among the first pixel or the second pixel as the pixel indicating the gas leak estimated position.

The above-described configuration further includes a second determination unit that determines a pixel located at a lower position among the first pixel and the second pixel as the pixel indicating the gas leak estimated position when the density of the gas is lower than the density of the air, and that determines the pixel located at a higher position among the first pixel and the second pixel as the pixel indicating the gas leak estimated position when the density of the gas is higher than the density of the air.

When the density of the gas is lower than the density of the air (methane gas, for example), the gas leaking from the monitoring target goes from the bottom to the top. When the density of the gas is higher than the density of the air (for example, chlorofluorocarbons), the leakage gas from the monitoring target moves down from the top. This configuration determines the pixel indicating the gas leak estimated position on the basis of such characteristics of the gas.

The above-described configuration further includes a second determination unit that sets a pixel having a largest pixel value or a pixel indicating the centroid of the gas region image among the plurality of pixels constituting the gas region image as a pixel-of-interest, and determines the first pixel as the pixel indicating the gas leak estimated position when a first line segment intersecting with a line connecting the first pixel and the second pixel and having both ends located on the outline and located between the first pixel and the pixel-of-interest is shorter than a second line segment intersecting with a line connecting the first pixel and the second pixel and having both ends located on the outline and located between the second pixel and the pixel-of-interest, and determines the second pixel as the pixel indicating the gas leak estimated position when the second line segment is shorter than the first line segment.

Gas that has leaked from the monitoring target hangs so as to spread. When the first line segment is shorter than the second line segment, this configuration regards the gas to be spreading from the first line segment side toward the second line segment side and determines the first pixel positioned on the first line segment side as the pixel indicating the gas leak estimated position. When the second line segment is shorter than the first line segment, this configuration regards the gas to be spreading from the second line segment side toward the first line segment side and determines the second pixel positioned on the second line segment side as the pixel indicating the gas leak estimated position.

The above-described configuration further includes a second determination unit that sets a pixel having a largest pixel value or a pixel indicating the centroid of the gas region image among the plurality of pixels constituting the gas region image as a pixel-of-interest, divides the gas region image into a first divided image including the first pixel and a second divided image including the second pixel by a dividing line intersecting with a line connecting the first pixel and the second pixel and passing through the pixel-of-interest, determines the first pixel as the pixel indicating the gas leak estimated position when the area of the first divided image is smaller than the area of the second divided image, and determines the second pixel as the pixel indicating the gas leak estimated position when the area of the second divided image is smaller than the area of the first divided image.

Gas that has leaked from the monitoring target hangs so as to spread. When the area of the first divided image is smaller than the area of the second divided image, this configuration regards the gas to be spreading from the first divided image side to the second divided image side and determines that first pixel included in the first divided image as the pixel indicating the gas leak estimated position. When the area of the second divided image is smaller than the area of the first divided image, the configuration regards the gas to be spreading from the second divided image side toward the first divided image side and determines the second pixel included in the second divided image as the pixel indicating the gas leak estimated position.

The above-described configuration further includes a second determination unit that sets a pixel having a largest pixel value or a pixel indicating the centroid of the gas region image among the plurality of pixels constituting the gas region image as a pixel-of-interest, divides the gas region image into a first divided image including the first pixel and a second divided image including the second pixel by a dividing line intersecting with a line connecting the first pixel and the second pixel and passing through the pixel-of-interest, determines the first pixel as the pixel indicating the gas leak estimated position when the outline of the first divided image is smaller than the outline of the second divided image, and determines the second pixel as the pixel indicating the gas leak estimated position when the outline of the second divided image is smaller than the outline of the first divided image.

Gas that has leaked from the monitoring target hangs so as to spread. When the outline of the first divided image is smaller than the outline of the second divided image, this configuration regards the gas to be spreading from the first divided image side to the second divided image side and determines that first pixel included in the outline of the first divided image as the pixel indicating the gas leak estimated position. When the outline of the second divided image is smaller than the outline of the first divided image, the configuration regards the gas to be spreading from the second divided image side toward the first divided image side and determines the second pixel included in the outline of the second divided image as the pixel indicating the gas leak estimated position.

In the above-described configuration, the second determination unit determines a pixel indicating the gas leak estimated position for each of the plurality of gas region images aligned in time series, and sets the determined pixel indicating the plurality of gas leak estimated positions as a pixel indicating a plurality of first gas leak estimated positions and sets each of coordinate values of pixels indicating the plurality of first gas leak estimated positions as a population, and determines a pixel indicating a coordinate value of an average value or a median value of the population as a pixel indicating a second gas leak estimated position.

The pixel indicating the second gas leak estimated position is determined on the basis of a plurality of pixels indicating the first gas leak estimated positions. The pixels indicating the plurality of first gas leak estimated positions are pixels indicating gas leak estimated positions obtained from each of the plurality of gas region images aligned in time series. Therefore, the second gas leak estimated position is a gas leak estimated position with little influence of change in the wind direction. That is, the second gas leak estimated position is a gas leak estimated position that is not separated away from the gas leak position even with the change in the wind direction. Therefore, according to this configuration, it is possible to prevent deterioration of accuracy of the gas leak estimated position even with the change in the wind direction.

In the above-described configuration, the first determination unit determines the first pixel and the second pixel for each of the plurality of gas region images aligned in time series, and the second determination unit sets coordinate values of individual pixels within a range in which the feature points concentrate from among the plurality of first pixels and the plurality of second pixels determined by the first determination unit as a population, and determines a pixel indicating a coordinate value of an average value or a median value of the population as the pixel indicating the gas leak estimated position.

This configuration determines the pixel indicating the gas leak estimated position on the basis of pixels indicating feature points (first pixels and second pixels) obtained from each of the plurality of gas region images aligned in time series. Therefore, the gas leak estimated position is a gas leak estimated position that is not separated away from the gas leak position even with the change in the wind direction. Therefore, according to this configuration, it is possible to prevent deterioration of accuracy of the gas leak estimated position even with the change in the wind direction.

The configuration further includes a display control unit that controls to display the image of the monitoring region in which the gas leak estimated position is indicated, on a display unit.

According to this configuration, the positional relationship between the gas leak estimated position and the monitoring region can be grasped.

A gas leak position estimation method according to a second aspect of the embodiment includes: a first step of specifying a gas region image indicating a region in which gas hangs within an image obtained by photographing a monitoring region; and a second step of determining a pixel indicating a gas leak estimated position estimated as a position of gas leak from among a plurality of pixels constituting an outline of the gas region image.

With the gas leak position estimation method according to the second aspect of the embodiment, it is possible to achieve a same operational effect as the gas leak position estimation device according to the first aspect of the embodiment.

A gas leak position estimation program according to a third aspect of the embodiment causes a computer to perform: a first step of specifying a gas region image indicating a region in which gas hangs within an image obtained by photographing a monitoring region; and a second step of determining a pixel indicating a gas leak estimated position estimated as a position of gas leak from among a plurality of pixels constituting an outline of the gas region image.

With the gas leak position estimation program according to the third aspect of the embodiment, it is possible to achieve a same operational effect as the gas leak position estimation device according to the first aspect of the embodiment.

A gas leak position estimation device according to a fourth aspect of the embodiment includes: an arithmetic control unit that specifies a gas region image indicating a region in which gas hangs within an image obtained by photographing a monitoring region and that determines a pixel indicating a gas leak estimated position estimated as a position of gas leak from among a plurality of pixels constituting the outline of the gas region image; and a display unit that displays the image of the monitoring region in which the gas leak estimated position is indicated.

With the gas leak position estimation device according to the fourth aspect of the embodiment, it is possible to achieve a same operational effect as the gas leak position estimation device according to the first aspect of the embodiment. In addition to this, with the gas leak position estimation device according to the fourth aspect of the embodiment, the positional relationship between the gas leak estimated position and the monitoring region can be grasped.

This application claims the benefit of Japanese Patent Application No. 2016-41171, filed Mar. 3, 2016, which is hereby incorporated by reference herein in its entirety.

While the present invention has been appropriately and fully described in connection with the embodiments thereof with reference to the accompanying drawings, it is to be noted that various changes and/or modifications are apparent to those skilled in the art. Accordingly, such changes and modifications carried out by those skilled in the art are to be understood as included within the scope of the present invention as defined by the appended claims, unless they depart the scope of the claims described herein.

INDUSTRIAL APPLICABILITY

According to the present invention, it is possible to provide a gas leak position estimation device, a gas leak position estimation method, and a gas leak position estimation program.

The invention claimed is:
1. A gas leak position estimation device comprising:
a specifier that specifies a gas region image indicating a region in which gas hangs within an image obtained by photographing a monitoring region;
a first determiner that determines a pixel indicating a gas leak estimated position estimated as a position of gas leak from among a plurality of pixels constituting an outline of the gas region image; and
a first calculator that calculates a regression line indicating a relationship between individual positions of a plurality of pixels constituting the gas region image,
wherein the first determiner determines one of a first pixel and a second pixel positioned at two points at which the regression line and the outline intersect with each other as the pixel indicating the position of the gas leak.

2. The gas leak position estimation device according to claim 1, further comprising:
a first extractor that extracts an instantaneous gas region image indicating a region in which the gas hangs at a point of photographing each of images from among each of a plurality of the images aligned in time series; and
a generator that performs processing of adding pixel values of pixels at a same position in the plurality of instantaneous gas region images extracted from each of the plurality of images so as to generate a cumulative gas region image which is an image obtained by accumulating the plurality of instantaneous gas region images,
wherein the specifier specifies the cumulative gas region image after binarization processing as the gas region image.

3. The gas leak position estimation device according to claim 1, further comprising a second determiner that sets a pixel having a largest pixel value or a pixel indicating the centroid of the gas region image among the plurality of pixels constituting the gas region image as a pixel-of-interest, determines the first pixel as the pixel indicating the gas leak estimated position when a distance between the first pixel and the pixel-of-interest is shorter than a distance between the second pixel and the pixel-of-interest, and determines the second pixel as the pixel indicating the gas leak estimated position when a distance between the second pixel and the pixel-of-interest is shorter than a distance between the first pixel and the pixel-of-interest.

4. The gas leak position estimation device according to claim 3,
wherein the second determiner determines the pixel indicating the gas leak estimated position for each of the plurality of gas region images aligned in time series, and sets the determined pixel indicating the plurality of gas leak estimated positions as a pixel indicating a plurality of first gas leak estimated positions,
sets each of coordinate values of pixels indicating the plurality of first gas leak estimated positions as a population, and
determines a pixel indicating a coordinate value of an average value or a median value of the population as a pixel indicating a second gas leak estimated position.

5. The gas leak position estimation device according to claim 3,
wherein the first determiner determines the first pixel and the second pixel for each of the plurality of gas region images aligned in time series, and
the second determiner sets coordinate values of individual pixels within a range in which the feature points concentrate from among the plurality of first pixels and the plurality of second pixels determined by the first determiner as a population, and determines a pixel indicating a coordinate value of an average value or a median value of the population as the pixel indicating the gas leak estimated position.

6. The gas leak position estimation device according to claim 1, further comprising a second determiner that determines a pixel located at a lower position among the first pixel and the second pixel as the pixel indicating the gas leak estimated position when the density of the gas is lower than the density of the air, and that determines the pixel located at a higher position among the first pixel and the second pixel as the pixel indicating the gas leak estimated position when the density of the gas is higher than the density of the air.

7. The gas leak position estimation device according to claim 1, further comprising
a second determiner that
sets a pixel having a largest pixel value or a pixel indicating the centroid of the gas region image among the plurality of pixels constituting the gas region image as a pixel-of-interest,
determines the first pixel as the pixel indicating the gas leak estimated position when a first line segment intersecting with a line connecting the first pixel and the second pixel and having both ends located on the outline and located between the first pixel and the pixel-of-interest is shorter than a second line segment intersecting with a line connecting the first pixel and the second pixel and having both ends located on the outline and located between the second pixel and the pixel-of-interest, and determines the second pixel as the pixel indicating the gas leak estimated position when the second line segment is shorter than the first line segment.

8. The gas leak position estimation device according to claim 1, further comprising
a second determiner that
sets a pixel having a largest pixel value or a pixel indicating the centroid of the gas region image among the plurality of pixels constituting the gas region image as a pixel-of-interest,
divides the gas region image into a first divided image including the first pixel and a second divided image including the second pixel by a dividing line intersecting with a line connecting the first pixel and the second pixel and passing through the pixel-of-interest,
determines the first pixel as the pixel indicating the gas leak estimated position when the area of the first divided image is smaller than the area of the second divided image, and determines the second pixel as the pixel indicating the gas leak estimated position when the area of the second divided image is smaller than the area of the first divided image.

9. The gas leak position estimation device according to claim 1, further comprising
a second determiner that
sets a pixel having a largest pixel value or a pixel indicating the centroid of the gas region image among the plurality of pixels constituting the gas region image as a pixel-of-interest,
divides the gas region image into a first divided image including the first pixel and a second divided image including the second pixel by a dividing line intersecting with a line connecting the first pixel and the second pixel and passing through the pixel-of-interest,
determines the first pixel as the pixel indicating the gas leak estimated position when the outline of the first divided image is smaller than the outline of the second divided image, and determines the second pixel as the pixel indicating the gas leak estimated position when the outline of the second divided image is smaller than the outline of the first divided image.

10. The gas leak position estimation device according to claim 1, further comprising a display controller that controls to display the image of the monitoring region in which the gas leak estimated position is indicated, on a display part.

11. A gas leak position estimation device comprising:
a specifier that specifies a gas region image indicating a region in which gas hangs within an image obtained by photographing a monitoring region;
a first determiner that determines a pixel indicating a gas leak estimated position estimated as a position of gas leak from among a plurality of pixels constituting an outline of the gas region image; and
a setter that sets a circumscribed rectangle that is a rectangle having four sides being in contact with the gas region image and surrounding the gas region image,
wherein the first determiner determines one of the first pixel and the second pixel located at two points where two short sides of the circumscribed rectangle and the gas region image come in contact with each other as the pixel indicating the position of the gas leak.

12. The gas leak position estimation device according to claim 11,
wherein the setter sets the circumscribed rectangle having a minimum area among the circumscribed rectangles as the circumscribed rectangle.

13. The gas leak position estimation device according to claim 11, further comprising a display controller that controls to display the image of the monitoring region in which the gas leak estimated position is indicated, on a display part.

14. A gas leak position estimation device comprising:
a specifier that specifies a gas region image indicating a region in which gas hangs within an image obtained by photographing a monitoring region;
a first determiner that determines a pixel indicating a gas leak estimated position estimated as a position of gas leak from among a plurality of pixels constituting an outline of the gas region image;
a first extractor that extracts an instantaneous gas region image indicating a region in which the gas hangs at a point of photographing each of images from among each of a plurality of the images aligned in time series;
a generator that performs processing of adding pixel values of pixels at a same position in the plurality of instantaneous gas region images extracted from each of the plurality of images so as to generate a cumulative image including a cumulative gas region image which is an image obtained by accumulating the plurality of instantaneous gas region images;
a second extractor that performs extraction processing of extracting a pixel from a plurality of pixels constituting the cumulative image on the basis of a predetermined threshold; and
a first calculator that performs calculation processing of calculating a centroid of an image constituted with the pixels extracted with the threshold,
wherein the second extractor performs the extraction processing on the basis of each of the two or more thresholds of different values,
the first calculator calculates two or more centroids by performing the calculation processing on the images corresponding to each of two or more of the thresholds of different values,
the gas leak position estimation device further includes a second calculator that calculates a regression line indicating a relationship between the individual positions of the two or more centroids,
the specifier specifies the cumulative gas region image after binarization processing as the gas region image, and
the first determiner determines at least one of the first pixel and the second pixel located at two points at which the regression line and the outline intersect with each other as the pixel indicating the position of the gas leak.

15. The gas leak position estimation device according to claim 14, further comprising a display controller that controls to display the image of the monitoring region in which the gas leak estimated position is indicated, on a display part.

16. A gas leak position estimation method comprising:
specifying a gas region image indicating a region in which gas hangs within an image obtained by photographing a monitoring region;
determining a pixel indicating a gas leak estimated position estimated as a position of gas leak from among a plurality of pixels constituting an outline of the gas region image; and
calculating a regression line indicating a relationship between individual positions of a plurality of pixels constituting the gas region image,
determining one of a first pixel and a second pixel positioned at two points at which the regression line and the outline intersect with each other as the pixel indicating the position of the gas leak.

17. A gas leak position estimation method comprising:
specifying a gas region image indicating a region in which gas hangs within an image obtained by photographing a monitoring region;
determining a pixel indicating a gas leak estimated position estimated as a position of gas leak from among a plurality of pixels constituting an outline of the gas region image; and
setting a circumscribed rectangle that is a rectangle having four sides being in contact with the gas region image and surrounding the gas region image,
wherein the first determiner determines one of the first pixel and the second pixel located at two points where two short sides of the circumscribed rectangle and the gas region image come in contact with each other as the pixel indicating the position of the gas leak.

18. A gas leak position estimation method comprising:
specifying a gas region image indicating a region in which gas hangs within an image obtained by photographing a monitoring region;
determining a pixel indicating a gas leak estimated position estimated as a position of gas leak from among a plurality of pixels constituting an outline of the gas region image;
extracting an instantaneous gas region image indicating a region in which the gas hangs at a point of photographing each of images from among each of a plurality of the images aligned in time series;
performing processing of adding pixel values of pixels at a same position in the plurality of instantaneous gas region images extracted from each of the plurality of images so as to generate a cumulative image including a cumulative gas region image which is an image obtained by accumulating the plurality of instantaneous gas region images;
performing extraction processing of extracting a pixel from a plurality of pixels constituting the cumulative image on the basis of a predetermined threshold; and
performing calculation processing of calculating a centroid of an image constituted with the pixels extracted with the threshold,
wherein the extraction processing is performed on the basis of each of the two or more thresholds of different values,
calculating two or more centroids by performing the calculation processing on the images corresponding to each of two or more of the thresholds of different values,
calculating a regression line indicating a relationship between the individual positions of the two or more centroids,
specifying the cumulative gas region image after binarization processing as the gas region image, and
determining at least one of the first pixel and the second pixel located at two points at which the regression line and the outline intersect with each other as the pixel indicating the position of the gas leak.

* * * * *